United States Patent
Yoshioka et al.

(10) Patent No.: US 10,408,979 B2
(45) Date of Patent: Sep. 10, 2019

(54) OPTICAL FILTER

(71) Applicant: AGC Inc., Chiyoda-ku (JP)

(72) Inventors: Asana Yoshioka, Koriyama (JP);
Kazuhiko Shiono, Koriyama (JP);
Hiroyuki Arishima, Koriyama (JP);
Hiroki Hotaka, Koriyama (JP)

(73) Assignee: AGC Inc., Chiyoda-ku (JP)

( * ) Notice: Subject to any disclaimer, the term of this patent is extended or adjusted under 35 U.S.C. 154(b) by 413 days.

(21) Appl. No.: 15/071,446

(22) Filed: Mar. 16, 2016

(65) Prior Publication Data

US 2016/0195651 A1     Jul. 7, 2016

Related U.S. Application Data

(63) Continuation of application No. PCT/JP2014/084352, filed on Dec. 25, 2014.

(30) Foreign Application Priority Data

Dec. 26, 2013    (JP) ................................ 2013-270008
Nov. 14, 2014    (JP) ................................ 2014-232201

(51) Int. Cl.
*F21V 9/04*       (2018.01)
*F21V 9/06*       (2018.01)
(Continued)

(52) U.S. Cl.
CPC ............... *G02B 5/208* (2013.01); *B32B 7/00* (2013.01); *B32B 7/02* (2013.01); *G02B 5/223* (2013.01);
(Continued)

(58) Field of Classification Search
CPC . G02B 5/22; G02B 5/26; G02B 5/208; G02B 5/282; G02B 5/223; G02B 5/285;
(Continued)

(56) References Cited

U.S. PATENT DOCUMENTS 8,159,596 B2    4/2012   Yamano
2008/0258043 A1*   10/2008   Suzuki ................... G02B 5/282
                                                       250/208.1
(Continued)

FOREIGN PATENT DOCUMENTS

CN          103858028       6/2014
DE          10109243 A1    9/2002
(Continued)

OTHER PUBLICATIONS

Submission by the third party dated Jul. 12, 2017 in Japanese Patent Application No. 2015-555008.
(Continued)

*Primary Examiner* — Mustak Choudhury
(74) *Attorney, Agent, or Firm* — Oblon, McClelland, Maier & Neustadt, L.L.P.

(57) ABSTRACT

Provided is an optical filter, which includes a light-absorbing layer and a light-reflecting layer and satisfies the following requirements: (i) in a spectral transmittance curve at an incident angle of 0°, an average transmittance over the 430-620 nm wavelength range is ≥80%, an average transmittance over the 430-450 nm wavelength range is ≥76%, an average transmittance over the 735-1100 nm wavelength range is ≤5%, and an average transmittance over the 350-395 nm wavelength is ≤5%; and (ii) there is a wavelength $\lambda_0(UV)$ with transmittance of 50% in the 400-425 nm wavelength range in the spectral transmittance curve at the incident angle of 0°, there is a wavelength $\lambda_{30}(UV)$ with transmittance of 50% in the 400-425 nm wavelength range in a spectral transmittance curve at an incident angle of 30°, and an absolute value of a difference between the wavelengths, $|\lambda_0(UV)-\lambda_{30}(UV)|$ is ≤5 nm.

21 Claims, 3 Drawing Sheets

(51) Int. Cl.
  *G02B 5/08* (2006.01)
  *G02B 5/20* (2006.01)
  *B32B 7/02* (2019.01)
  *B32B 7/00* (2019.01)
  *G02B 5/22* (2006.01)
  *G02B 5/28* (2006.01)
(52) U.S. Cl.
  CPC .......... *G02B 5/282* (2013.01); *B32B 2307/40* (2013.01); *B32B 2307/416* (2013.01); *B32B 2551/00* (2013.01)
(58) Field of Classification Search
  CPC .... G02B 1/04; G02B 5/08; G02B 5/20; B32B 11/00; B32B 7/00; B32B 7/02; B32B 2551/00; B32B 2307/416; B32B 2307/40; F21V 9/04; F21V 9/06
  USPC ....... 359/356, 359, 558, 581, 582, 586, 588, 359/589; 348/342, 374; 252/182.32, 252/182.33, 587, 588; 250/208.1, 226
  See application file for complete search history.

(56) References Cited

U.S. PATENT DOCUMENTS

| | | |
|---|---|---|
| 2010/0025642 A1 | 2/2010 | Hanaki et al. |
| 2010/0210762 A1 | 8/2010 | Hanaki et al. |
| 2011/0051230 A1* | 3/2011 | Yamano ................. G02B 5/208 359/359 |
| 2012/0243077 A1 | 9/2012 | Osawa et al. |
| 2014/0063597 A1 | 3/2014 | Shimmo et al. |
| 2014/0264202 A1 | 9/2014 | Nagaya et al. |
| 2015/0285971 A1 | 10/2015 | Nagaya et al. |

FOREIGN PATENT DOCUMENTS

| | | |
|---|---|---|
| EP | 2 116 585 A1 | 11/2009 |
| JP | 8-133790 A | 5/1996 |
| JP | 2004-504481 A | 2/2004 |
| JP | 2004-102223 | 4/2004 |
| JP | 2006-106570 | 4/2006 |
| JP | 2006-182584 A | 7/2006 |
| JP | 2006-301489 | 11/2006 |
| JP | 2008-39961 | 2/2008 |
| JP | 2008-51985 | 3/2008 |
| JP | 2008-181028 | 8/2008 |
| JP | 2008-303130 A | 12/2008 |
| JP | 2009-96973 | 5/2009 |
| JP | 2009-96974 | 5/2009 |
| JP | 2009-209126 A | 9/2009 |
| JP | 2009-227938 A | 10/2009 |
| JP | 2009-267396 A | 11/2009 |
| JP | 2010-197595 A | 9/2010 |
| JP | 2011-100084 | 5/2011 |
| JP | 2011-133532 A | 7/2011 |
| JP | 2012-103340 | 5/2012 |
| JP | 2012-137645 | 7/2012 |
| JP | 2012-137646 | 7/2012 |
| JP | 2012-137647 | 7/2012 |
| JP | 2012-137648 | 7/2012 |
| JP | 2012-137649 | 7/2012 |
| JP | 2012-137650 | 7/2012 |
| JP | 2012-137651 | 7/2012 |
| JP | 2012-185468 A | 9/2012 |
| JP | 2013-68688 A | 4/2013 |
| JP | 2013-83915 A | 5/2013 |
| JP | 2013-190553 | 9/2013 |
| JP | 2014-126642 | 7/2014 |
| KR | 10-2014-0088559 | 7/2014 |
| TW | 201321438 | 6/2013 |
| WO | WO 2002/08664 A1 | 1/2002 |
| WO | WO 2008/105301 A1 | 9/2008 |
| WO | WO 2013/054864 A1 | 4/2013 |
| WO | WO 2014/002864 A1 | 1/2014 |
| WO | WO 2014/163405 A1 | 10/2014 |

OTHER PUBLICATIONS

International Search Report dated Mar. 17, 2015 in PCT/JP2014/084352, filed Dec. 25, 2014 (with English Translation).

Written Opinion dated Mar. 17, 2015 in PCT/JP2014/084352, filed Dec. 25, 2014.

International Preliminary Report on Patentability and Written Opinion dated Jul. 7, 2016 in PCT/JP2014/084352 filed Dec. 25, 2014 (submitting English translation only).

* cited by examiner

OPTICAL FILTER

CROSS-REFERENCE TO RELATED APPLICATIONS

This application is a continuation of prior International Application No. PCT/JP2014/084352 filed on Dec. 25, 2014 which is based upon and claims the benefit of priority from Japanese Patent Applications Nos. 2013-270008 filed on Dec. 26, 2013 and 2014-232201 filed on Nov. 14, 2014; the entire contents of all of which are incorporated herein by reference.

FIELD

The present invention relates to an optical filter which selectively blocks light in a specific wavelength range.

BACKGROUND

In recent years, an optical filter which transmits light in a visible wavelength range but blocks light in a near-infrared wavelength range has been used for various applications.

For example, in an imaging device such as a digital still camera, a digital video camera, or a cellphone camera using a solid-state image sensor (such as CCD or CMOS), or a display device such as an automatic exposure meter using a light-receiving element, an optical filter is used for obtaining good color reproducibility. Spectral sensitivity of the solid-state image sensor or the light-receiving element is in a wavelength range ranging from an ultraviolet wavelength range to a near-infrared wavelength range, and on the other hand, human visibility is only in a visible wavelength range. In order to make the spectral sensitivity of the solid-state image sensor or the light-receiving element close to human visibility, an optical filter is disposed on a subject side of the solid-state image sensor.

Various types of such optical filters have been proposed. For example, there can be cited a reflection-type filter having a dielectric multilayer film which is formed by alternately stacking dielectric thin films with different refractive indices on a single side or both sides of a transparent substrate, and reflects light to be blocked by utilizing interference of light. In the filter having the dielectric multilayer film, optical characteristics thereof sometimes change, depending on an incident angle of light. For this reason, if such a filter is used, the spectral sensitivity of the solid-state image sensor may be influenced by the incident angle.

On the contrary, JP-A-2008-181028 and JP-A-2008-051985 describe, as optical filters which are less influenced by an incident angle of light with a wavelength of 600 to 800 nm, an absorption-type filter having an absorbing layer containing an absorbing dye in a transparent resin, and a filter formed by combining a dielectric multilayer film and an absorbing layer. In the filter having the absorbing layer, a change in optical characteristics caused by an incident angle of light is small, so that it is possible to reduce the influence of the incident angle of light with the wavelength of 600 to 800 nm, with respect to spectral sensitivity of a solid-state image sensor.

Further, JP-A-2013-190553 describes an optical filter having an absorbing layer containing a compound which absorbs light with a wavelength of 380 to 450 nm, which can reduce incidence angle dependence of the light with the wavelength of 380 to 450 nm.

Meanwhile, due to progress of high performance of the solid-state image sensor, the optical filter which has a wavelength with transmittance of 50% in 400 nm or more, and can increase average transmittance from a wavelength with transmittance of about 10% to a wavelength with transmittance of about 80% (to provide a steep change of transmittance) has been demanded. The optical filter described in JP-A-2013-190553 has not sufficiently satisfied these demands.

SUMMARY

As described above, the existing optical filters have not sufficiently satisfied the demands for the high performance of the solid-state image sensor. Therefore, it is demanded to provide an optical filter which is less influenced by an incident angle of light, and which can increase an amount of light in a visible wavelength range to be taken into the solid-state image sensor.

An object of the present invention is to provide an optical filter which has small incidence angle dependence at a wavelength of 500 nm or less, and high average transmittance in a visible wavelength range (hereafter, also referred to as a visible light range).

The present invention relates to a optical filter comprising a light absorbing layer and a light reflecting layer, wherein the following requirements (i) and (ii) are satisfied:

(i) in a spectral transmittance curve at an incident angle of 0°, average transmittance in the range of 430 to 620 nm is 80% or more, average transmittance in the range of 430 to 450 nm is 76% or more, average transmittance in the range of 735 to 1100 nm is 5% or less, and average transmittance in the range of 350 to 395 nm is 5% or less; and (ii) there is a wavelength $\lambda_0(UV)$ with transmittance of 50% within the range of 400 to 425 nm in the spectral transmittance curve at the incident angle of 0°, there is a wavelength $\lambda_{30}(UV)$ with transmittance of 50% within the range of 400 to 425 nm in a spectral transmittance curve at an incident angle of 30°, and an absolute value of a difference between the wavelengths, $|\lambda_0(UV)-\lambda_{30}(UV)|$, is 5 nm or less.

In an optical filter of the present invention, incidence angle dependence of light is small, and average transmittance in a visible light range is high at a wavelength of 500 nm or less. For this reason, when the optical filter of the present invention is used, it is possible to make spectral sensitivity of a solid-state image sensor or a light-receiving element close to human visibility and to reduce a difference in spectral sensitivities caused by a difference in incident angles.

DETAILED DESCRIPTION

Figure 1A:
FIGS. 1A to 1B are sectional views each schematically illustrating an optical filter according to an embodiment of the present invention.

Although embodiments of the present invention will be described based on the drawings, the drawings are provided only for an illustrative purpose, and by no means are intended to limit the present invention. Besides, please be noted that the drawings are schematic ones, and a relationship between a thickness and a flat dimension, a ratio of the thickness, and so on are different from actual ones. Further, in the following description, the same reference numerals and symbols are used to designate components having the same or substantially the same function and configuration, and overlapped explanation will be omitted.

An optical filter according to an embodiment of the present invention (referred to as a present filter, hereinafter) has a transparent substrate 11, a light absorbing layer (referred to as an absorbing layer, hereinafter) 12, and a light reflecting layer (referred to as a reflecting layer, hereinafter) 13.

It is possible that one layer of the absorbing layer 12 and one layer of the reflecting layer 13 are provided in the present filter, and it is also possible that two layers or more of either or both of the absorbing layer 12 and the reflecting layer 13 are provided in the present filter. When, for example, two layers of the absorbing layer 12 are provided, one of the layers is set to a near-infrared absorbing layer formed of a resin containing an absorber A having an absorption peak wavelength (corresponding to later-described $\lambda_{max\text{-}P}(IR)$) at a wavelength of 670 to 780 nm, for example. Further, the other layer is set to an ultraviolet absorbing layer formed of a resin containing an absorber U having an absorption peak wavelength (corresponding to later-described $\lambda_{max\text{-}P}(UV)$) at a wavelength of 360 to 415 nm, and thus the absorbing layers 12 may also be separately configured.

Further, the absorbing layer 12 and the reflecting layer 13 may be provided on the same principle surface of the transparent substrate 11, and they may also be provided on different principle surfaces. When the absorbing layer 12 and the reflecting layer 13 are provided on the same principle surface, an order of stacking these layers is not limited.

Hereinafter, configuration examples of the present filter will be described by using sectional views. Note that the configuration of the present filter is not limited to these examples.

FIG. 1A illustrates an example of configuration in which the absorbing layer 12 is provided on one principle surface of the transparent substrate 11, and the reflecting layer 13 is provided on the other principle surface of the transparent substrate 11.

Note that description that "there is provided another layer such as the absorbing layer 12 or the reflecting layer 13 on one principle surface of the transparent substrate 11" is interpreted as one including not only a case where the other layer is provided by being brought into contact with the transparent substrate 11, but also a case where another functional layer is provided between the transparent substrate 11 and the other layer, and the same applies to the configuration hereinbelow.

Figure 1B:
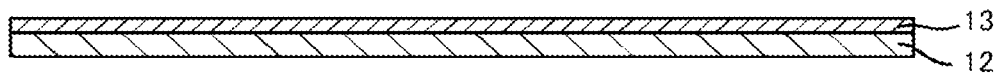

Further, FIG. 1B illustrates a configuration example in which the absorbing layer 12 and the reflecting layer 13 are provided, and it is also possible to employ a configuration including no transparent substrate 11 as the present filter.

Figure 2:
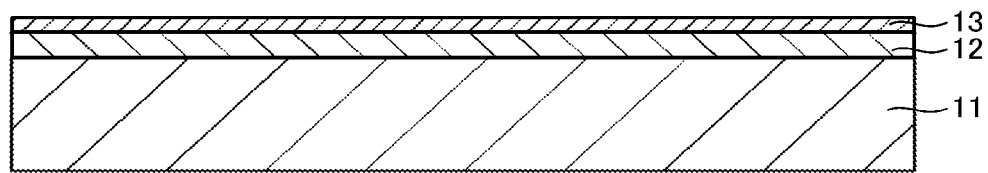
FIG. 2 is a sectional view schematically illustrating a modified example of the optical filter according to the embodiment of the present invention.

FIG. 2 illustrates an example of configuration in which the absorbing layer 12 and the reflecting layer 13 are provided on one principle surface of the transparent substrate 11.

In FIG. 1A, FIG. 1B, and FIG. 2, the absorbing layer 12 may also include two layers of the above-described near-infrared absorbing layer and ultraviolet absorbing layer. For example, in FIG. 1A, the absorbing layer 12 may employ a configuration in which the near-infrared absorbing layer is provided on the transparent substrate 11, and the ultraviolet absorbing layer is provided on the near-infrared absorbing layer, or it may also employ a configuration in which the ultraviolet absorbing layer is provided on the transparent substrate 11, and the near-infrared absorbing layer is provided on the ultraviolet absorbing layer.

In like manner, in FIG. 2, the absorbing layer 12 may employ a configuration in which the near-infrared absorbing layer is provided on the transparent substrate 11, and the ultraviolet absorbing layer is provided on the near-infrared absorbing layer, or it may also employ a configuration in which the ultraviolet absorbing layer is provided on the transparent substrate 11, and the near-infrared absorbing layer is provided on the ultraviolet absorbing layer.

Figure 3:
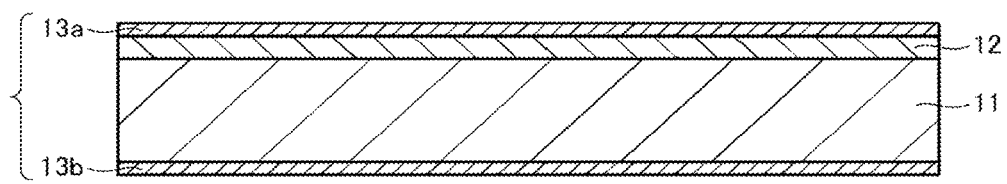
FIG. 3 is a sectional view schematically illustrating a modified example of the optical filter according to the embodiment of the present invention.

FIG. 3 illustrates an example of configuration in which the absorbing layer 12 is provided on one principle surface of the transparent substrate 11, and reflecting layers 13a and 13b are provided on a principle surface of the absorbing layer 12 and the other principle surface of the transparent substrate 11, respectively.

Figure 4:
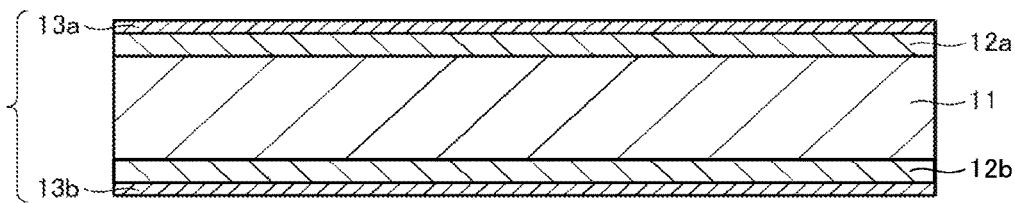
FIG. 4 is a sectional view schematically illustrating a modified example of the optical filter according to the embodiment of the present invention.

FIG. 4 illustrates an example of configuration in which absorbing layers 12a and 12b are provided on both principle surfaces of the transparent substrate 11, and further, the reflecting layers 13a and 13b are provided on principle surfaces of the absorbing layers 12a and 12b, respectively.

In each of the optical filters with the configurations illustrated in FIG. 3 and FIG. 4, the two layers of the reflecting layer 13a and the reflecting layer 13b to be combined may be the same or different. For example, it is also possible that the reflecting layers 13a and 13b have characteristics such that they reflect light in an ultraviolet wavelength range and an infrared wavelength range, and transmits light in a visible light range, in which the reflecting layer 13a is configured to reflect light in the ultraviolet wavelength range and a first infrared wavelength range, and the reflecting layer 13b is configured to reflect light in the ultraviolet wavelength range and a second infrared wavelength range. Note that it is set that in the infrared wavelength range, the first infrared wavelength range is positioned on a short-wavelength side relative to the second infrared wavelength range. In this case, it is set that the reflecting layers 13a and 13b have 5% or less of transmittance at a wavelength of 350 to 400 nm as the ultraviolet wavelength range, for example. Further, it is also possible to provide an optical design such that the reflecting layer 13a has 5% or less of transmittance at a wavelength of 735 to 900 nm, and the reflecting layer 13b has 5% or less of transmittance at a wavelength of 900 to 1100 nm.

Further, in the optical filter with the configuration illustrated in FIG. 4, the two layers of the absorbing layers 12a and 12b may be the same or different. When the two layers of the absorbing layers 12a and 12b are different, it is possible that the absorbing layer 12a is the above-described near-infrared absorbing layer and the absorbing layer 12b is the above-described ultraviolet absorbing layer, or the absorbing layer 12a is the above-described ultraviolet absorbing layer and the absorbing layer 12b is the above-described near-infrared absorbing layer, for example, as described above.

Note that although illustration is omitted, when it is configured such that the absorbing layer 12, or the first absorbing layer 12a or the second absorbing layer 12b is positioned at an uppermost surface, a visible light transmittance loss due to reflection is generated on the absorbing layer, so that it is preferable to provide an anti-reflection layer on the absorbing layer. Further, the anti-reflection layer may also be configured to cover not only the uppermost surface of the absorbing layer 12, or the first absorbing layer 12a or the second absorbing layer 12b, but also the whole side surface of the absorbing layer. In that case, it is possible to increase a moisture-proof effect of the absorbing layer.

The present filter satisfies the following requirements (i) and (ii).

(i) In a spectral transmittance curve when an incident angle is 0°, average transmittance at a wavelength of 430 to 620 nm is 80% or more, average transmittance at a wavelength of 430 to 450 nm is 76% or more, average transmittance at a wavelength of 735 to 1100 nm is 5% or less, and average transmittance at a wavelength of 350 to 395 nm is 5% or less.

(ii) There is a wavelength $\lambda_0(UV)$ with transmittance of 50% in a wavelength range of 400 to 425 nm in the spectral transmittance curve when the incident angle is 0°, there is a wavelength $\lambda_{30}(UV)$ with transmittance of 50% in the wavelength range of 400 to 425 nm in a spectral transmittance curve when an incident angle is 30°, and an absolute value of a difference between the wavelengths $|\lambda_0(UV)-\lambda_{30}(UV)|$ is 5 nm or less.

By using the filter satisfying the requirement (i), it is possible to increase an amount of light taken into a solid-state image sensor, at the wavelength of 430 to 620 nm, and to block light in a range of wavelength of 735 nm or more and a range of wavelength of 395 nm or less. Consequently, it is possible to make spectral sensitivity of the solid-state image sensor close to human visibility.

By using the filter satisfying the requirement (ii), it is possible to reduce incidence angle dependence of light at the wavelength of 400 to 425 nm. As a result of this, it is possible to reduce incidence angle dependence of spectral sensitivity of the solid-state image sensor at the wavelength of 400 to 425 nm.

In the present specification, "the spectral transmittance curve when the incident angle is 0°" indicates the spectral transmittance curve of light which is incident in vertical to a principle surface of the optical filter, and "the spectral transmittance curve when the incident angle is 30°" indicates the spectral transmittance curve of light which is incident with the angle of 30° relative to the vertical direction to the principle surface of the optical filter.

The present filter is preferable to further satisfy a requirement (iii).

(iii) There is a wavelength $\lambda_0(IR)$ with transmittance of 50% within the range of 600 to 700 nm in the spectral transmittance curve at the incident angle of 0°, there is a wavelength $\lambda_{30}(IR)$ with transmittance of 50% within the range of 600 to 700 nm in the spectral transmittance curve at the incident angle of 30°, and an absolute value of a difference between the wavelengths, $|\lambda_0(IR)-\lambda_{30}(IR)|$, is 5 nm or less.

By using the filter satisfying the requirement (iii), incidence angle dependence of light at the wavelength of 600 to 700 nm can be reduced. As a result of this, it is possible to reduce incidence angle dependence of spectral sensitivity of a solid-state image sensor at the wavelength of 600 to 700 nm.

In the spectral transmittance curve when the incident angle is 0°, the average transmittance at the wavelength of 430 to 620 nm of the present filter is 80% or more, preferably 85% or more, more preferably 90% or more, and still more preferably 92% or more. As the average transmittance at the wavelength of 430 to 620 nm of the optical filter becomes high, it is possible to increase utilization efficiency of light of a solid-state image sensor.

In the spectral transmittance curve when the incident angle is 0°, the average transmittance in the wavelength range of 430 to 450 nm of the present filter is 76% or more, preferably 78% or more, and more preferably 80% or more. As the average transmittance at the wavelength of 430 to 450 nm of the optical filter becomes high, transmittance of light on the long wavelength side relative to the wavelength $\lambda_0(UV)$ can be increased, and it is possible to increase utilization efficiency of light of a solid-state image sensor in the wavelength range.

In the spectral transmittance curve when the incident angle is 0°, the average transmittance at the wavelength of 735 to 1100 nm of the present filter is 5% or less, preferably 4% or less, and more preferably 3% or less.

In the spectral transmittance curve when the incident angle is 0°, the average transmittance at the wavelength of 350 to 395 nm of the present filter is 5% or less, preferably 4% or less, and more preferably 3% or less.

As the average transmittance at the wavelength of 735 to 1100 nm and the wavelength of 350 to 395 nm of the optical filter becomes low, light in these ranges can be blocked. As a result of this, it is possible to make spectral sensitivity of a solid-state image sensor close to human visibility. It is more preferable that the transmittance of the optical filter at all wavelengths in the wavelength range of 735 to 1100 nm and the wavelength range of 350 to 395 nm, does not exceed the predetermined values.

In the present filter, the transmittance becomes high as the wavelength becomes long in a wavelength range of 395 to 430 nm. Although a change in the transmittance in the above-described wavelength range is large, the wavelength $\lambda_0(UV)$ and the wavelength $\lambda_{30}(UV)$ are within a wavelength range of 400 to 425 nm. The wavelength $\lambda_0(UV)$ and the wavelength $\lambda_{30}(UV)$ are preferably within a wavelength range of 405 to 420 nm, and more preferably within a wavelength range of 410 to 420 nm. When the wavelength $\lambda_0(UV)$ and the wavelength $\lambda_{30}(UV)$ are within the wavelength range of 400 to 425 nm, it is possible to reduce the incidence angle dependence of light in the wavelength range.

In the present filter, the value of $|\lambda_0(UV)-\lambda_{30}(UV)|$ is 5 nm or less, preferably 3 nm or less, and more preferably 2 nm or less. The value of $|\lambda_0(UV)-\lambda_{30}(UV)|$ is an index indicating the incidence angle dependence of light of the present filter at the wavelength of 400 to 425 nm. It is indicated that the smaller the value, the lower the incidence angle dependence.

In the present filter, the wavelength $\lambda_0(IR)$ and the wavelength $\lambda_{30}(IR)$ are preferably within a wavelength range of 620 to 700 nm, and more preferably within a wavelength range of 620 to 680 nm. When the wavelength $\lambda_0(IR)$ and the wavelength $\lambda_{30}(IR)$ are within the wavelength range of 620 to 700 nm, it is possible to reduce the incidence angle dependence of light in the wavelength range.

In the present filter, the value of $|\lambda_0(IR)-\lambda_{30}(IR)|$ is preferably 5 nm or less, more preferably 3 nm or less, and still more preferably 2 nm or less. The value of $|\lambda_0(IR)-\lambda_{30}(IR)|$ is an index indicating the incidence angle dependence of light of the present filter in the wavelength range of 600 to 700 nm. It is indicated that the smaller the value, the lower the incidence angle dependence.

Hereinafter, description will be made on the transparent substrate 11, the absorbing layer 12, and the reflecting layer 13, which form the present filter.

(Transparent Substrate)

A shape of the transparent substrate 11 is not particularly limited, and it may be a block state, a plate state, or a film state.

Although depending on a composing material, a thickness of the transparent substrate 11 is preferably 0.03 mm to 5 mm, and more preferably 0.05 mm to 1 mm, in terms of reduction in thickness.

The composing material of the transparent substrate 11 is not particularly limited as long as it transmits light in the visible light range. There can be cited, for example, an inorganic material such as a glass or crystal, and an organic material such as a resin. The transparent substrate 11 is preferably formed of the inorganic material, from viewpoints of an optical characteristic as an optical filter, stability in shape relating to long term reliability of mechanical characteristics, or the like, a handling ability at a time of manufacturing filters, and so on. The glass is preferable, from a viewpoint of workability.

As the resin capable of being used for the transparent substrate 11, there can be cited a polyester resin such as polyethyleneterephthalate (PET) or polybutyleneterephthalate (PBT), a polyolefin resin such as polyethylene, polypropylene, or ethylene-vinyl acetate copolymer, a norbornene resin, an acrylic resin such as polyacrylate, or polymethylmethacrylate, an urethane resin, a vinyl chloride resin, a fluorocarbon resin, a polycarbonate resin, a polyvinylbutyral resin, a polyvinylalcohol resin, and the like.

As the glass capable of being used for the transparent substrate 11, there can be cited an absorption-type glass in which CuO or the like is added to a fluorophosphate-based glass, a phosphate-based glass, or the like, a soda lime glass, a borosilicate glass, a non-alkaline glass, a quartz glass, and the like.

As the crystalline material capable of being used for the transparent substrate 11, there can be cited a birefringent crystal such as crystalline quartz, lithium niobate, or sapphire.

The above-described materials are sometimes used as a material of a low-pass filter and a wavelength plate to reduce moire and false color in an imaging device such as a digital still camera, a digital video camera, a monitoring camera, an on-vehicle camera, or a web camera. When the birefringent crystal such as crystalline quartz, lithium niobate, or sapphire is used as the material of the transparent substrate 11, it is possible to supply functions of the low-pass filter and the wavelength plate to the optical filter according to the present embodiment. As a result of this, the number of parts can be reduced, which is effective for reduction in size and thickness of the imaging device.

(Absorbing Layer)

The absorbing layer 12 is formed of a transparent resin containing an ultraviolet absorber U. It is preferable that the absorbing layer 12 further contains a near-infrared absorber A.

In the present filter, it is also possible that the absorbing layer 12 is formed by providing a plurality of absorbing layers formed of a layer made of the transparent resin containing the absorber U, and a layer made of the transparent resin containing the absorber A, being separated layers.

In this case, both of the layer made of the transparent resin containing the absorber U and the layer made of the transparent resin containing the absorber A may be formed on the same main principle surface of the transparent substrate 11, and the layers may also be respectively provided on both surfaces of the transparent substrate 11 so as to sandwich the substrate.

In the present filter, a thickness of the absorbing layer 12 is preferably 0.1 μm to 100 μm. When the absorbing layer 12 is formed of a plurality of absorbing layers, it is preferable that a total thickness of the respective absorbing layers becomes 0.1 μm to 100 μm. The thickness of the absorbing layer 12 is appropriately determined in accordance with use thereof, namely, a disposed space in a used device, a required absorption characteristic, and the like. When the thickness is less than 0.1 μm, there is a possibility that desired optical characteristics cannot be sufficiently exerted. Further, when the thickness exceeds 100 μm, flatness of the layer is lowered, and there is a possibility that variation in plane occurs in an absorption. The thickness of the absorbing layer 12 is more preferably 0.3 μm to 50 μm. If the thickness is 0.3 μm to 50 μm, it is possible to achieve both of the sufficient optical characteristics and the flatness of the layer.

(Ultraviolet Absorber U)

The ultraviolet absorber U (referred to also as an absorber U, hereinafter) is a compound which absorbs light with a wavelength of 430 nm or less. As the absorber U, one satisfying the following requirements (iv-1) and (iv-2), is preferable.

(iv-1) In a light absorption spectrum of a wavelength range of 350 to 800 nm of the ultraviolet absorber dissolved in dichloromethane, there is at least one absorption peak wavelength in the range of 415 nm or less, and the longest wavelength $\lambda_{max}(UV)$ of the absorption peak wavelength(s) in the range of 415 nm or less is within a range of 360 to 415 nm.

(iv-2) a spectral transmittance curve of the ultraviolet absorber dissolved in dichloromethane, a difference $\lambda_{L90}-\lambda_{L50}$ is 13 nm or less, in which $\lambda_{L90}$ is a wavelength longer than the $\lambda_{max}(UV)$ and has transmittance of 90%, and 450 is a wavelength longer than the $\lambda_{max}(UV)$ and has transmittance of 50%, provided that transmittance at the $\lambda_{max}(UV)$ is 10%.

The absorption peak wavelength of the ultraviolet absorber U satisfying the requirement of (iv-1), does not change greatly also in a transparent resin. Specifically, even if the absorber U satisfying the requirement of (iv-1) is dissolved or dispersed in the transparent resin, it is preferable that a absorption peak wavelength $\lambda_{max-P}(UV)$ in an absorption spectrum in the resin is within a wavelength range of 360 to 415 nm.

The ultraviolet absorber U satisfying the requirement of (iv-2) exhibits excellent steepness also when it is contained in the transparent resin. Specifically, even if the absorber U satisfying the requirement of (iv-2) is dissolved or dispersed in the transparent resin, it is preferable since the absorber U exhibits steepness similar to that exhibited in dichloromethane, as long as a difference between a wavelength $\lambda_{P50}$ with transmittance of 50% and a wavelength $\lambda_{P90}$ with transmittance of 90% ($\lambda_{L90}-\lambda_{L50}$) is 14 nm or less, and the difference is more preferably 13 nm or less, and still more preferably 12 nm or less.

When the absorber U satisfying the requirement of (iv-1) is used, it is possible to set each of the wavelength $\lambda_0(UV)$ and the wavelength $\lambda_{30}(UV)$ of the present filter obtained as the absorbing layer 12 by dissolving or dispersing the absorber U in the transparent resin, to fall within the wavelength range of 400 to 425 nm.

(iv-2) When the absorber U satisfying the requirement of (iv-2) is used, it is possible to reduce the difference between the wavelength with transmittance of 50% and the wavelength with transmittance of 90% of the present filter obtained as the absorbing layer 12 by dissolving or dispersing the absorber U in the transparent resin. Specifically, it is possible to set the change in the spectral transmittance curve to be steep between the wavelengths.

In the present specification, an absorption spectrum of a wavelength range of 350 to 800 nm the absorber U dissolved in dichloromethane, is referred to also as "absorption spectrum of the absorber U".
The absorption peak wavelength $\lambda_{max}(UV)$ in the absorption spectrum of the absorber U is referred to as "$\lambda_{max}(UV)$ of the ultraviolet absorber U".
The spectral transmittance curve the absorber U dissolved in dichloromethane is referred to as "spectral transmittance curve of the ultraviolet absorber U".
In the spectral transmittance curve of the ultraviolet absorber U, when the ultraviolet absorber U is contained in the amount which causes the transmittance at the $\lambda_{max}(UV)$ of the ultraviolet absorber U to be 10%, the wavelength with transmittance of 90% at a wavelength longer than the $\lambda_{max}(UV)$ of the ultraviolet absorber U is referred to as "$\lambda_{L90}$", and the wavelength with transmittance of 50% at a wavelength longer than the $\lambda_{max}(UV)$ of the ultraviolet absorber U is referred to as "$\lambda_{L50}$".

Further, in the present specification, a measured absorption spectrum of a wavelength range of 350 to 800 nm of an absorbing layer produced by dissolving the absorber U in the transparent resin, is also referred to as "absorption spectrum of the absorber U in the resin".
An absorption peak wavelength $\lambda_{max\text{-}P}(UV)$ in the absorption spectrum of the absorber U in the resin is referred to as "$\lambda_{max\text{-}P}(UV)$ of the ultraviolet absorber U".
A measured spectral transmittance curve of the absorbing layer produced by dissolving the absorber U in the transparent resin, is referred to as "spectral transmittance curve of the ultraviolet absorber U in the resin".
In the spectral transmittance curve of the ultraviolet absorber U in the resin, when the ultraviolet absorber U is contained in an amount which causes transmittance at the $\lambda_{max\text{-}P}(UV)$ of the ultraviolet absorber U to be 10%, the wavelength with transmittance of 90% at a wavelength longer than the $\lambda_{max\text{-}P}(UV)$ of the ultraviolet absorber U is referred to as "$\lambda_{P90}$", and the wavelength with transmittance of 50% at a wavelength longer than the $\lambda_{max\text{-}P}(UV)$ of the ultraviolet absorber U is referred to as "$\lambda_{P50}$".

The wavelength $\lambda_{max}(UV)$ of the ultraviolet absorber U is preferably within a range of 365 to 415 nm, and more preferably within a range of 370 to 410 nm. When the wavelength $\lambda_{max}(UV)$ of the ultraviolet absorber U is within the above wavelength range, it is easy to obtain the above-described effect, namely, the steep change in the spectral transmittance curve at the wavelength of 400 to 425 nm.
Further, the difference between the $\lambda_{L90}$ and the $\lambda_{L50}$ ($\lambda_{L90}-\lambda_{L50}$) of the absorber U is preferably 12 nm or less, more preferably 11 nm or less, and still more preferably 9 nm or less. When the value of $\lambda_{L90}-\lambda_{L50}$ is within the above range, the above-described effect is easily obtained.

As concrete examples of the absorber U satisfying the aforementioned requirements (iv-1) and (iv-2), there can be cited dyes of oxazole base, merocyanine base, cyanine base, naphthalimide base, oxadiazole base, oxazine base, oxazolidine base, naphthalic acid base, styryl base, anthracene base, cyclic carbonyl base, triazole base, and the like.
As commercial products, there can be cited, for example, Uvitex (registered trademark) OB (product name, manufactured by Ciba-Geigy), Hakkol RF-K (product name, manufactured by Showa Chemical Industry Co., LTD.), Nikkafluor EFS, Nikkafluor SB-conc (each of which is a product name, and manufactured by Nippon Chemical Industrial CO., LTD.), and the like, as oxazole-based products. As merocyanine-based products, there can be cited S0511 (product name, manufactured by Few Chemicals GmbH), and the like. As cyanine-based products, there can be cited SMP370, SMP416 (each of which is a product name, and manufactured by Hayashibara Co., Ltd.), and the like. As naphthalimide-based products, there can be cited Lumogen (registered trademark) F violet570 (product name, manufactured by BASF), and the like.

As the absorber U, there can be cited a dye represented by the following general formula (N). Note that in the present specification, the dye represented by the formula (N) is described as a dye (N), unless otherwise noted. A dye represented by another formula is also described in a similar manner. Further, a group represented by a formula (1n) is described as a group (1n). A group represented by another formula is also described in a similar manner.

[Chemical formula 1]

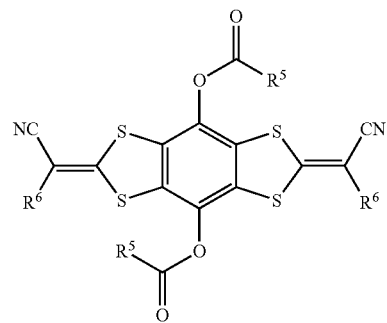

(N)

In the formula (N), each of $R^5$ independently represents a hydrocarbon group with a carbon number of 1 to 20 which may include a saturated or unsaturated ring structure, or a branch. Concretely, there can be cited a linear or branched alkyl group, alkenyl group, saturated cyclic hydrocarbon group, aryl group, alaryl group, or the like. Further, in the formula (N), each of $R^6$ is independently a cyano group or a group represented by the following formula (n).

—COOR$^7$     (n)

In the formula (n), $R^7$ is a hydrocarbon group with a carbon number of 1 to 20 which may include a saturated or unsaturated ring structure, or a branch. Concretely, there can be cited a linear or branched chain alkyl group, alkenyl group, saturated cyclic hydrocarbon group, aryl group, alaryl group, or the like.

As $R^5$ in the dye (N), groups represented by the following formulas (1n) to (4n) are particularly preferable. Further, as $R^6$ in the dye (N), a group represented by the following formula (5n) is particularly preferable.

[Chemical formula 2]

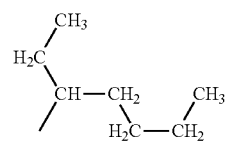

(1n)

-continued

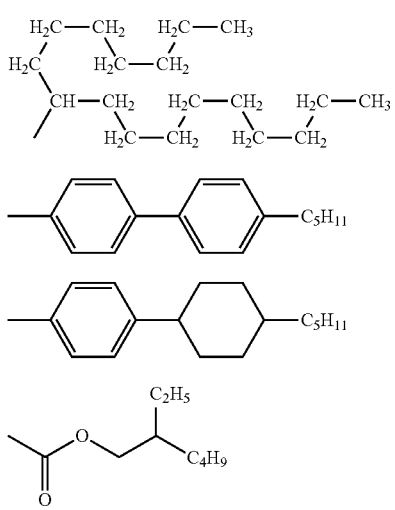

(2n)
(3n)
(4n)

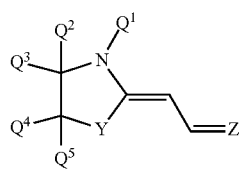

(5n)

As concrete examples of the dye (N), dyes (N-1) to (N-4) with compositions represented in Table 1 can be exemplified. Note that concrete structures of $R^5$ and $R^6$ in Table 1 correspond to the above-described formulas (1n) to (5n). Corresponding dye abbreviations are also provided in Table 1. Note that two $R^5$ existing in each of the dyes (N-1) to (N-4) are the same, and two $R^6$ existing in each of the dyes (N-1) to (N-4) are also the same.

TABLE 1

| Dye | $R^5$ | $R^6$ |
|---|---|---|
| N-1 | 1n | 5n |
| N-2 | 2n | 5n |
| N-3 | 3n | 5n |
| N-4 | 4n | 5n |

Among the exemplified absorbers U described above, the dyes of the oxazole base and the merocyanine base are preferable, and as commercial products thereof, there can be cited, for example, Uvitex (registered trademark) OB, Hakkol RF-K, and S0511.

(Merocyanine-Based Dye)
As the absorber U, a merocyanine-based dye represented by the following general formula (M) is particularly preferable.

[Chemical formula 3]

(M)

In the formula (M), Y represents a methylene group substituted by $Q^6$ and $Q^7$ or an oxygen atom. Here, each of $Q^6$ and $Q^7$ independently represents a hydrogen atom, a halogen atom, or an alkyl group or an alkoxy group with a carbon number of 1 to 10. It is preferable that each of $Q^6$ and $Q^7$ is independently a hydrogen atom, or an alkyl group or an alkoxy group with a carbon number of 1 to 10, and it is more preferable that each of $Q^6$ and $Q^7$ is a hydrogen atom or at least one of $Q^6$ and $Q^7$ is a hydrogen atom and the other is an alkyl group with a carbon number of 1 to 4. It is particularly preferable that each of $Q^6$ and $Q^7$ is a hydrogen atom.

$Q^1$ represents an optionally substituted monovalent hydrocarbon group with a carbon number of 1 to 12. As a monovalent hydrocarbon group having no substituent, an alkyl group with a carbon number of 1 to 12 in which a part of hydrogen atoms may be substituted by an aliphatic ring, an aromatic ring, or an alkenyl group, a cycloalkyl group with a carbon number of 3 to 8 in which a part of hydrogen atoms may be substituted by an aromatic ring, an alkyl group, or an alkenyl group, and an aryl group with a carbon number of 6 to 12 in which a part of hydrogen atoms may be substituted by an aliphatic ring, an alkyl group, or an alkenyl group, are preferable.

When $Q^1$ is an unsubstituted alkyl group, the alkyl group may be a linear or branched one, and a carbon number thereof is more preferably 1 to 6.

As an alkyl group with a carbon number of 1 to 12 in which a part of hydrogen atoms is substituted by an aliphatic ring, an aromatic ring, or an alkenyl group, an alkyl group with a carbon number of 1 to 4 having a cycloalkyl group with a carbon number of 3 to 6, or an alkyl group with a carbon number of 1 to 4 substituted by a phenyl group, is more preferable, and an alkyl group with a carbon number of 1 or 2 substituted by a phenyl group is particularly preferable. Note that the alkyl group substituted by the alkenyl group indicates one which is an alkenyl group as a whole but does not include an unsaturated bond between a first position and a second position, and is, for example, an allyl group, a 3-butenyl group, or the like.

As a hydrocarbon group having a substituent, an alkoxy group, an acyl group, an acyloxy group, a cyano group, a dialkyl amino group, or a hydrocarbon group having one or more chlorine atoms, is preferable. A carbon number of each of these alkoxy group, acyl group, acyloxy group, and dialkyl amino group is preferably 1 to 6.

A preferable $Q^1$ is an alkyl group with a carbon number of 1 to 6 in which a part of hydrogen atoms may be substituted by a cycloalkyl group or a phenyl group.

A particularly preferable $Q^1$ is an alkyl group with a carbon number of 1 to 6, and as concrete examples thereof, there can be cited, for example, a methyl group, an ethyl group, a propyl group, an isopropyl group, a butyl group, an isobutyl group, a t-butyl group, and the like.

Each of $Q^2$ to $Q^5$ independently represents a hydrogen atom, a halogen atom, or an alkyl group or an alkoxy group with a carbon number of 1 to 10. The carbon number of each of the alkyl group and the alkoxy group is preferably 1 to 6, and more preferably 1 to 4.

It is preferable that at least one of $Q^2$ and $Q^3$ is an alkyl group, and it is more preferable that each of $Q^2$ and $Q^3$ is an alkyl group. When $Q^2$ or $Q^3$ is not the alkyl group, it is more preferably a hydrogen atom. It is particularly preferable that each of $Q^2$ and $Q^3$ is an alkyl group with a carbon number of 1 to 6.

It is preferable that at least one of $Q^4$ and $Q^5$ is a hydrogen atom, and it is more preferable that each of $Q^4$ and $Q^5$ is a hydrogen atom. When $Q^4$ or $Q^5$ is not the hydrogen atom, it is preferably an alkyl group with a carbon number of 1 to 6.

Z represents any one of bivalent groups represented by the following formulas (Z1) to (Z5).

[Chemical formula 4]

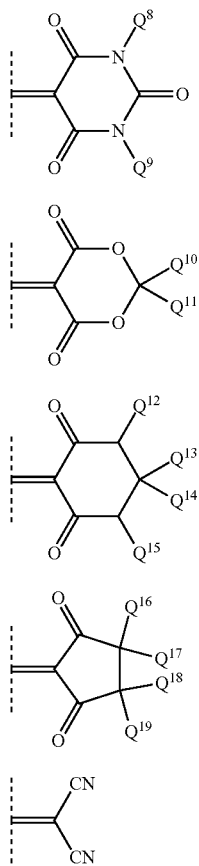

In the formulas (Z1) to (Z5), each of $Q^8$ and $Q^9$ independently represents an optionally substituted monovalent hydrocarbon group with a carbon number of 1 to 12. $Q^8$ and $Q^9$ may be different groups, but, they are preferably the same group.

As a monovalent hydrocarbon group having no substituent, an alkyl group with a carbon number of 1 to 12 in which a part of hydrogen atoms may be substituted by an aliphatic ring, an aromatic ring, or an alkenyl group, a cycloalkyl group with a carbon number of 3 to 8 in which a part of hydrogen atoms may be substituted by an aromatic ring, an alkyl group, or an alkenyl group, and an aryl group with a carbon number of 6 to 12 in which a part of hydrogen atoms may be substituted by an aliphatic ring, an alkyl group, or an alkenyl group, are preferable.

When each of $Q^8$ and $Q^9$ is an unsubstituted alkyl group, the alkyl group may be a linear or branched one, and a carbon number thereof is more preferably 1 to 6.

As an alkyl group with a carbon number of 1 to 12 in which a part of hydrogen atoms is substituted by an aliphatic ring, an aromatic ring, or an alkenyl group, an alkyl group with a carbon number of 1 to 4 having a cycloalkyl group with a carbon number of 3 to 6, or an alkyl group with a carbon number of 1 to 4 substituted by a phenyl group, is more preferable, and an alkyl group with a carbon number of 1 or 2 substituted by a phenyl group is particularly preferable. Note that the alkyl group substituted by the alkenyl group indicates one which is an alkenyl group as a whole but does not include an unsaturated bond between a first position and a second position, and is, for example, an allyl group, a 3-butenyl group, or the like.

As a monovalent hydrocarbon group having a substituent, an alkoxy group, an acyl group, an acyloxy group, a cyano group, a dialkyl amino group, or a hydrocarbon group having one or more chlorine atoms, is preferable. A carbon number of each of these alkoxy group, acyl group, acyloxy group, and dialkyl amino group is preferably 1 to 6.

Each of preferable $Q^8$ and $Q^9$ is an alkyl group with a carbon number of 1 to 6 in which a part of hydrogen atoms may be substituted by a cycloalkyl group or a phenyl group.

Each of particularly preferable $Q^8$ and $Q^9$ is an alkyl group with a carbon number of 1 to 6, and as concrete examples thereof, there can be cited, for example, a methyl group, an ethyl group, a propyl group, an isopropyl group, a butyl group, an isobutyl group, a t-butyl group, and the like.

Each of $Q^{10}$ to $Q^{19}$ independently represents a monovalent hydrocarbon group with a carbon number of 1 to 12 which may have a hydrogen atom or a substituent. A monovalent hydrocarbon group with a carbon number of 1 to 12 which may have a substituent is a hydrocarbon group similar to the above-described $Q^8$ and $Q^9$. As a monovalent hydrocarbon group with a carbon number of 1 to 12 which may have a substituent, an alkyl group with a carbon number of 1 to 6 which has no substituent is preferable.

It is more preferable that each of $Q^{10}$ and $Q^{11}$ is an alkyl group with a carbon number of 1 to 6, and it is particularly preferable that both of $Q^{10}$ and $Q^{11}$ are the same alkyl group.

Each of $Q^{12}$ and $Q^{15}$ is preferably a hydrogen atom or an alkyl group with a carbon number of 1, to 6 which has no substituent. It is preferable that each of two groups ($Q^{13}$ and $Q^{14}$, $Q^{16}$ and $Q^{17}$, $Q^{18}$ and $Q^{19}$) bonded to the same carbon atom is a hydrogen atom or an alkyl group with a carbon number of 1 to 6.

As compounds each represented by the formula (M), a compound in which Y is an oxygen atom and Z is the group (Z1) or the group (Z2), and a compound in which Y is a methylene group substituted by $Q^6$ and $Q^7$ and Z is the group (Z1) or the group (Z5), are preferable.

It is more preferable that Z when Y is the oxygen atom is the group (Z1) or the group (Z2), $Q^1$ is an alkyl group with a carbon number of 1 to 6, each of $Q^2$ and $Q^3$ is a hydrogen atom or an alkyl group with a carbon number of 1 to 6, and each of $Q^4$ and $Q^5$ is a hydrogen atom. It is particularly preferable that $Q^1$ is an alkyl group with a carbon number of 1 to 6, each of $Q^2$ and $Q^3$ is an alkyl group with a carbon number of 1 to 6, each of $Q^4$ and $Q^5$ is a hydrogen atom, and Z is the group (Z1) or the group (Z2).

As the compound in which Y is the methylene group substituted by $Q^6$ and $Q^7$ and Z is the group (Z1) or the group (Z5), one in which $Q^1$ is an alkyl group with a carbon number of 1 to 6, each of $Q^2$ and $Q^3$ is a hydrogen atom or an alkyl group with a carbon number of 1 to 6, each of $Q^4$ to $Q^7$ is a hydrogen atom, and Z is the group (Z1) or the group (Z5) is preferable, and one in which $Q^1$ is an alkyl group with a carbon number of 1 to 6, each of $Q^2$ to $Q^7$ is a hydrogen atom, and Z is the group (Z1) or the group (Z5) is more preferable.

As a compound represented by the formula (M), a compound in which Y is an oxygen atom and Z is the group (Z1) or the group (Z2) is preferable, and a compound in which Y is an oxygen atom and Z is the group (Z1) is particularly preferable.

As concrete examples of the dye (M), compounds represented by the following formulas (M-1) to (M-11) can be cited.

[Chemical formula 5]

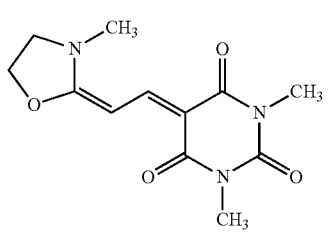
(M-1)

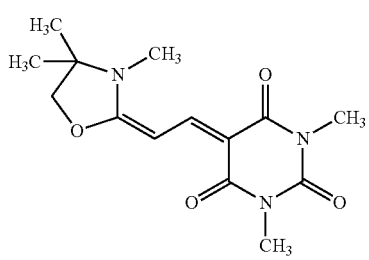
(M-2)

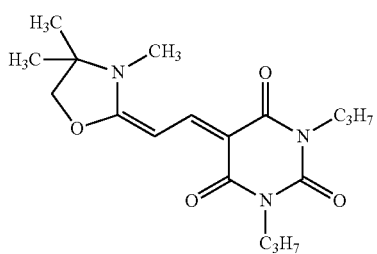
(M-3)

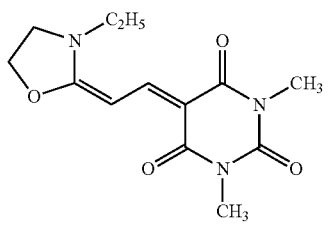
(M-4)

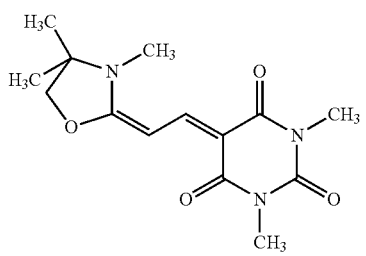
(M-5)

-continued

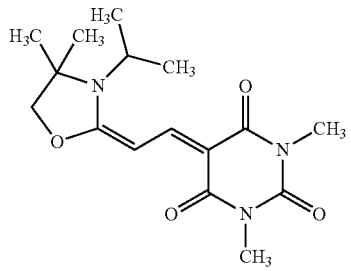
(M-6)

[Chemical formula 6]

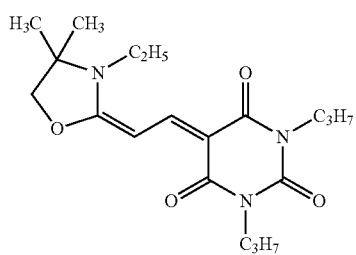
(M-7)

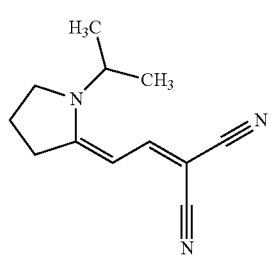
(M-8)

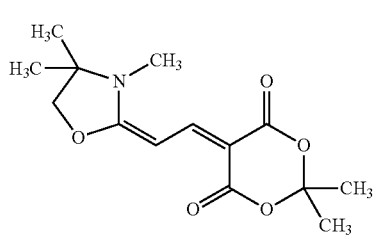
(M-9)

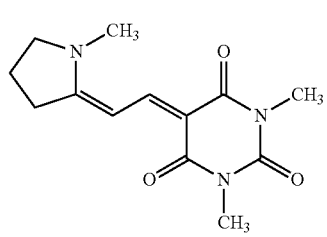
(M-10)

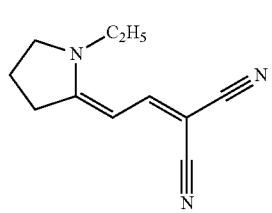
(M-11)

Further, as the absorber U, it is also possible to use ABS407 manufactured by Exciton Inc., UV381A, UV381B, UV382A, UV386A, or VIS404A manufactured by QCR Solutions Corp., ADA1225, ADA3209, ADA3216, ADA3217, ADA3218, ADA3230, ADA5205, ADA2055, ADA6798, ADA3102, ADA3204, ADA3210, ADA2041, ADA3201, ADA3202, ADA3215, ADA3219, ADA3225, ADA3232, ADA4160, ADA5278, ADA5762, ADA6826, ADA7226, ADA4634, ADA3213, ADA3227, ADA5922, ADA5950, ADA6752, ADA7130, ADA8212, ADA2984, ADA2999, ADA3220, ADA3228, ADA3235, ADA3240, ADA3211, ADA3221, ADA5220, or ADA7158 manufactured by H.W. Sands Corp., DLS381B, DLS381C, DLS382A, DLS386A, DLS404A, DLS405A, DLS405C, DLS403A, or the like manufactured by CRYSTALYN Chemical Company.

A content of the absorber U in the absorbing layer 12 is preferably determined so that there is a wavelength with transmittance of 50% in a wavelength range of 400 to 425 nm, in the spectral transmittance curve when the incident angle is 0° of the present filter. The absorber U is contained in the absorbing layer 12 by preferably 0.01 to 30 parts by mass, more preferably 0.05 to 25 parts by mass, and still more preferably 0.1 to 20 parts by mass to 100 parts by mass of the transparent resin.

One kind of the absorber U may be used solely or two kinds or more thereof may be mixed and used.

(Near-Infrared Absorber A)

As the near-infrared absorber A (which is also referred to as an absorber A, hereinafter), one satisfying the following requirement (v) is preferable.

(v) In a light absorption spectrum of a wavelength range of 350 to 800 nm of the absorber A dissolved in dichloromethane, there is an absorption peak wavelength $\lambda_{max}(IR)$ being the longest wavelength within a wavelength range of 650 to 800 nm.

When the absorber A satisfying the requirement of (v) is used, it is possible to set each of the wavelength $\lambda_0(IR)$ and the wavelength $\lambda_{30}(IR)$ of the present filter obtained as the absorbing layer 12 by dissolving or dispersing the absorber A in the transparent resin, to fall within the wavelength range of 600 to 700 nm.

In the present specification, an absorption spectrum of a wavelength range of 350 to 800 nm the absorber A dissolved in dichloromethane, is referred to as "absorption spectrum of the absorber A". Further, the absorption peak wavelength $\lambda_{max}(IR)$ in the absorption spectrum of the absorber A is referred to as "$\lambda_{max}(IR)$ of the near-infrared absorber".

The absorption peak wavelength $\lambda_{max}(IR)$ of the absorber A is more preferably within a wavelength range of 670 to 780 nm, and still more preferably within a wavelength range of 680 to 765 nm. Further, it is preferable that substantially no absorption maximum exists, at a wavelength of 620 nm or less, in the absorption spectrum of the absorber A. Here, the description that substantially no absorption maximum exists, indicates that when the absorber A of an amount which causes transmittance at the absorption peak wavelength $\lambda_{max}(IR)$ to be 10%, is dissolved in dichloromethane, transmittance at a wavelength of 620 nm or less is 90% or more.

As concrete examples of the absorber A satisfying the above-described requirement (v) and suitable for the present embodiment, there can be cited, for example, dyes of diimonium base, cyanine base, phthalocyanine base, naphthalocyanine base, dithiol metal complex base, azo base, polymethine base, phthalide, naphthoquinone base, anthraquinone base, indophenol base, pyrylium base, thiopyrylium base, squarylium base, croconium base, tetra-dehydrocholine base, triphenylmethane base, aminium base, and the like.

As the absorber A, the dyes of squarylium base, cyanine base, and diimonium base are preferable, and the dyes of squarylium base and cyanine base are more preferable among the aforementioned absorbers A, from viewpoints that the absorption wavelength can be selected variously and freely, steepness of the absorption can be designed arbitrarily, the absorption in the visible light range is small, reliability is high, and so on.

As commercial products of the dyes of cyanine base, there can be cited, for example, S0322, S0830, S2086, S2137, S2138, S2139, and S2265 (each of which is a product name, and manufactured by Few Chemicals GmbH), and the like.

(Squarylium-Based Dye)

As the absorber A, a squarylium-based dye (A1) represented by the following general formula (A1) is particularly preferable.

[Chemical formula 7]

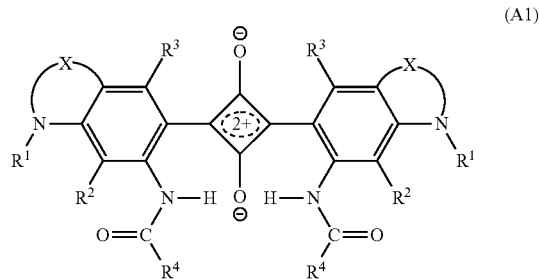

(A1)

Note that symbols in the formula (A1) are as follows.

X is independently a bivalent organic group represented by the following formula (1) or formula (2) in which one or more hydrogen atoms may be substituted by an alkyl group or an alkoxy group with a carbon number of 1 to 12.

$$-(CH_2)_{n1}-$$ (1)

In the formula (1), n1 is 2 or 3.

$$-(CH_2)_{n2}-O-(CH_2)_{n3}-$$ (2)

In the formula (2), each of n2 and n3 is independently an integer of 0 to 2, and a value of n2+n3 is 1 or 2.

Each of $R^1$ independently represents a saturated or unsaturated hydrocarbon group with a carbon number of 1 to 12, a saturated cyclic hydrocarbon group with a carbon number of 3 to 12, an aryl group with a carbon number of 6 to 12 or an alaryl group with a carbon number of 7 to 13, which may include a saturated ring structure, or a branch.

Each of $R^2$ and $R^3$ independently represents a hydrogen atom, a halogen atom, or an alkyl group or an alkoxy group with a carbon number of 1 to 10.

Each of $R^4$ independently represents a hydrocarbon group with a carbon number of 1 to 25 in which one or more hydrogen atoms may be substituted by a halogen atom, a hydroxyl group, a carboxy group, a sulfo group, or a cyano group. The hydrocarbon group may include an unsaturated bond, an oxygen atom, or a saturated or unsaturated ring structure between carbon atoms and may have a branch.

In the above description, the saturated or unsaturated ring structure refers to a hydrocarbon ring and a hetero ring having an oxygen atom as a hetero atom. It further encompasses a structure in which an alkyl group with a carbon number of 1 to 10 is bonded to a carbon atom constituting a ring.

The aryl group refers to a group which is bonded via a carbon atom constituting an aromatic ring included in an aromatic compound, for example, a benzene ring, a naphthalene ring, biphenyl, a furan ring, a thiophene ring, a pyrrole ring, or the like. The alaryl group refers to a linear or branched, saturated or unsaturated hydrocarbon group or a saturated cyclic hydrocarbon group, which may include a saturated ring structure, which is substituted by one or more aryl groups.

In the formula (2), a position of the oxygen atom is not particularly limited. Specifically, a nitrogen atom and an oxygen atom may be bonded, or an oxygen atom may be bonded directly to the benzene ring. Further, an oxygen atom may be positioned so as to be sandwiched by carbon atoms.

Note that X on the left and right sides in the dye (A1) may be the same or different, but, they are preferably the same from the viewpoint of productivity. Further, $R^1$ to $R^4$ may be the same or different on the left and right sides across the squarylium skeleton, but, they are preferably the same from the viewpoint of productivity.

As the dye (A1), a dye (A11) and a dye (A12) represented by the following formulas (A11) and (A12), respectively, are more preferable. In the formulas (A11) and (A12), the meaning of $R^1$ to $R^4$ is the same as that of $R^1$ to $R^4$ in the dye (A1). Further, Me represents a methyl group.

[Chemical formula 8]

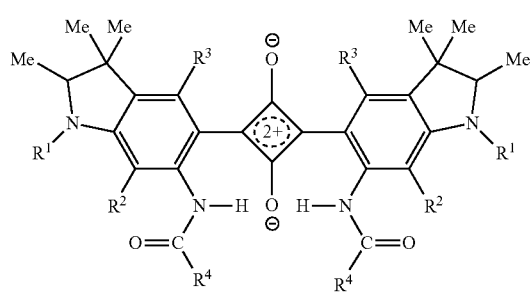

(A11)

[Chemical Formula 9]

In the dye (A1), from the viewpoint of heat resistance and reliability improvement, $R^1$ is preferably an alkyl group or an alkoxy group with a carbon number of 1 to 12 which may independently have a branch, and more preferably an alkyl group or an alkoxy group with a carbon number of 1 to 6 which may have a branch. In order to increase solubility to the transparent resin, an alkyl group with a carbon number of 1 to 6 which has a branch is still more preferable.

Further, in the dye (A1), each of $R^2$ and $R^3$ is independently preferable to be a hydrogen

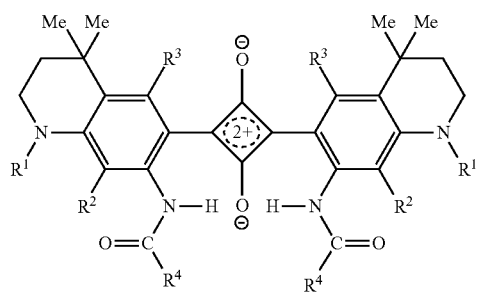

(A12)

atom, a halogen atom, or an alkyl group or an alkoxy group with a carbon number of 1 to 6. It is preferable that each of $R^2$ and $R^3$ is a hydrogen atom.

$R^4$ in the dye (A1) is preferably a branched hydrocarbon group with a carbon number of 5 to 25 represented by the following formula (4).

$$CH_{3-m}R^{13}{}_m \qquad (4)$$

In the formula (4), m is 1, 2 or 3, $R^{13}$ each independently represents a linear or branched hydrocarbon group (note that it is branched when m is 1) which may include an unsaturated bond, an oxygen atom, or a saturated or unsaturated ring structure between carbon atoms, and the total of carbon numbers of m number of $R^{13}$ is 4 to 24. From the viewpoint of solubility to the transparent resin, m is preferably 2 or 3.

As the saturated ring structure which may be included in $R^{13}$, there can be cited cyclic ether, cycloalkane, adamantane ring, diadamantane ring, or the like with a carbon number of 4 to 14. Further, as the unsaturated ring structure, there can be cited benzene, toluene, xylene, furan, benzofuran, or the like. When the ring structure is included, the carbon number of $R^{13}$ is indicated by a number including the carbon number of the ring.

Further, $R^4$ is preferably a branched hydrocarbon group with a carbon number of 6 to 20 and independently having no substituent, from the viewpoint of solubility to the organic solvent and the transparent resin. The carbon number of $R^4$ is more preferably 6 to 17, and still more preferably 6 to 14.

As the $R^4$ in the dye (A1), groups represented by the following formulas (1a) and (1b) are preferable as the group of m=1, groups represented by the following formulas (2a) to (2e) are preferable as the group of m=2, and groups represented by the following formulas (3a) to (3e) are preferable as the group of m=3, in the group (4). Among them, the groups (1b), (2a) to (2e), and (3b) are particularly preferable from the viewpoint of solubility.

[Chemical formula 10]

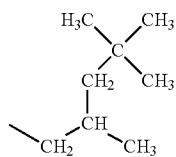

(1a)

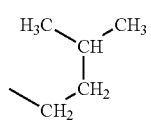

(1b)

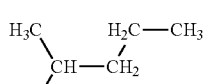

(2a)

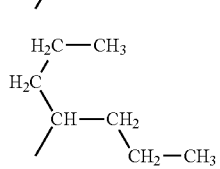

(2b)

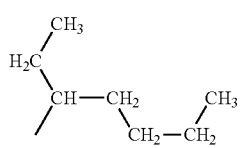

(2c)

-continued (2d)
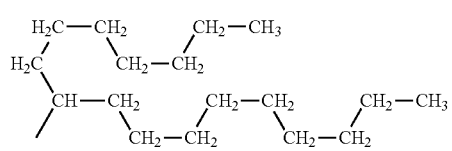

(2e)
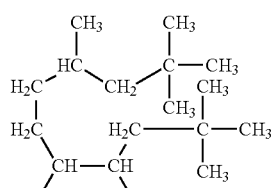

[Chemical formula 11]

(3a)
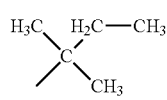

(3b)
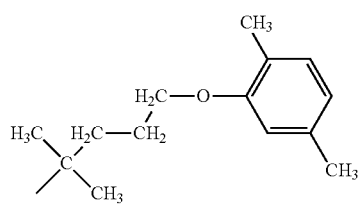

(3c)
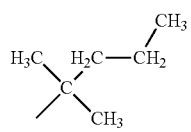

(3d)
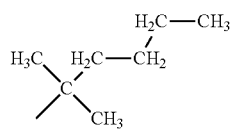

(3e)
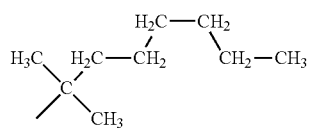

The absorber A is more preferably the dye (A11), and in the dye (A11), dyes (A11-1) to (A11-19) with compositions represented in Table 2 are particularly preferable from the viewpoints of solubility and heat resistance of the dyes. Note that in Table 2, "-" means a hydrogen atom. n-$C_3H_7$ represents a linear propyl group, and i-$C_3H_7$ represents a 1-methylethyl group. Concrete structures of $R^4$ in Table 2 correspond to the above formulas (1a), (1b), (2a) to (2e), and (3a) to (3e). Corresponding dye abbreviations are also provided in Table 2. Note that in the dyes (A11-1) to (A11-19), one $R^1$ existing on the left side and one $R^1$ existing on the right side, namely, two $R^1$ in total, are the same on the left and right sides, and the same applies to $R^2$ to $R^4$.

TABLE 2

| Dye | $R^1$ | $R^2$ | $R^3$ | $R^4$ |
|---|---|---|---|---|
| A11-1 | —$CH_3$ | — | — | 1a |
| A11-2 | —$CH_3$ | — | — | 1b |

TABLE 2-continued

| Dye | $R^1$ | $R^2$ | $R^3$ | $R^4$ |
|---|---|---|---|---|
| A11-3 | —$CH_3$ | — | — | 2a |
| A11-4 | —$CH_3$ | — | — | 2b |
| A11-5 | —$CH_3$ | — | — | 2c |
| A11-6 | —$CH_3$ | — | — | 2d |
| A11-7 | —$CH_3$ | — | — | 2e |
| A11-8 | —$CH_3$ | — | — | 3a |
| A11-9 | —$CH_3$ | — | — | 3b |
| A11-10 | —$CH_3$ | — | — | 3c |
| A11-11 | —$C_2H_5$ | — | — | 2c |
| A11-12 | —$C_2H_5$ | — | — | 3b |
| A11-13 | -n-$C_3H_7$ | — | — | 2c |
| A11-14 | -i-$C_3H_7$ | — | — | 2c |
| A11-15 | —$C(CH_3)_2$—$C_2H_5$ | — | — | 2c |
| A11-16 | —$C(CH_3)_2$—$C_2H_5$ | — | — | 3b |
| A11-17 | —$C(CH_3)_2$—$C_2H_5$ | — | — | 3c |
| A11-18 | —$C(CH_3)_2$—$C_2H_5$ | — | — | 3d |
| A11-19 | —$C(CH_3)_2$—$C_2H_5$ | — | — | 3e |

The content of the absorber A in the absorbing layer 12 is preferably within a range of 0.1 to 30 parts by mass to 100 parts by mass of the transparent resin. By setting the content to 0.1 parts by mass or more, desired near-infrared absorbing performance can be achieved, and by setting the content to 30 parts by mass or less, reduction in the near-infrared absorbing performance, increase in a haze value, and the like are suppressed. From these points of view, the content is more preferably within a range of 0.5 to 25 parts by mass, and still more preferably 1 to 20 parts by mass. Further, one kind of these absorbers A may be used solely or two kinds or more thereof may be mixed and used.

The absorbing layer 12 may further contain, other than the above-described absorber U and absorber A, various optional components which are normally contained in this kind of absorbing layer, within a range not impairing effects of the present invention. As the optional components, there can be cited, for example, a color tone correcting dye, a leveling agent, an antistatic agent, a heat stabilizer, a light stabilizer, an antioxidant, a dispersing agent, a flame retardant, a slip additive, a plasticizer, and the like. Further, the absorbing layer 12 may also contain an ultraviolet absorber and a near-infrared absorber other than the above-described absorber U and absorber A, within a range not impairing the effects of the present invention.

As the ultraviolet absorber other than the above-described absorber U, there can be cited one of benzotriazole base, benzophenone base, salicylate base, cyanoacrylate base, triazine base, okizanirido base, or nickel complex salt base, the other inorganic-based compounds (for example, zinc oxide, titanium oxide, cerium oxide, zirconium oxide, mica, kaolin, sericite), and the like.

As commercial products, there can be cited, for example, TINUVIN 326, TINUVIN 460, and TINUVIN 479 (each of which is a product name, and manufactured by BASF), BONA 3911 (product name, manufactured by ORIENT CHEMICAL INDUSTRIES CO., LTD.), and the like.

As the near-infrared absorber other than the absorber A, there can be cited inorganic fine particles of ITO (Indium Tin Oxides), ATO (Antimony-doped Tin Oxides), lanthanum boride, or the like.

From the viewpoint of solubility or dispersibility of not only the aforementioned absorber U and absorber A but also the various optional components, a refractive index ($n_d$) (at a wavelength of 589 nm) of the transparent resin in the absorbing layer 12 is preferably 1.45 or more, more preferably 1.5 or more, and still more preferably 1.6 or more. Although there is no particular upper limit of the refractive index of the transparent resin, it is preferable that the upper limit is about 1.72, because of easiness of obtainment or the like. Further, a glass transition temperature (Tg) of the transparent resin is preferably 0° C. to 380° C., more preferably 40° C. to 370° C., and still more preferably 100° C. to 360° C. When the glass transition temperature (Tg) of the transparent resin is within the range of 0° C. to 380° C., deterioration or deformation due to heat can be suppressed during a manufacturing process or during use of the present filter.

As concrete examples of the transparent resin, there can be cited a polyester resin, a polyether resin, an acrylic resin, a polyolefin resin, a polycycloolefin resin, a polycarbonate resin, an ene-thiol resin, an epoxy resin, a polyamide resin, a polyimide resin, a polyurethane resin, and a polystyrene resin. Among them, the acrylic resin, the polyester resin, the polycarbonate resin, or a cyclic olefin resin is preferable. It is possible to adjust the refractive index of the transparent resin by adjusting a molecule structure of a raw material component, or the like. Concretely, there can be cited a method in which a specific structure is given to a main chain and a side chain of a polymer of the raw material component. The structure given into the polymer is not particularly limited, but, as an example thereof, a fluorene skeleton can be cited.

It is also possible to use commercial products as the transparent resin. As commercial products of the acrylic resin, there can be cited OGSOL (registered trademark) EA-F5003 (product name, manufactured by Osaka Gas Chemicals Co., Ltd., with refractive index of 1.60), polymethylmethacrylate (with refractive index of 1.49), polyisobutylmethacrylate (with refractive index of 1.48) (each of which is a product name, and manufactured by Tokyo Chemical Industry Co., Ltd.), BR50 (product name, manufactured by Mitsubishi Rayon Co., Ltd., with refractive index of 1.56), and the like.

Further, as the polyester resin, there can be cited OKP4HT (with refractive index of 1.64), OKP4 (with refractive index of 1.61), B-OKP2 (with refractive index of 1.64), and OKP-850 (with refractive index of 1.65) (each of which is a product name, and manufactured by Osaka Gas Chemicals Co., Ltd.), VYLON (registered trademark) 103 (product name, manufactured by TOYOBO Co., Ltd., with refractive index of 1.55), as the polycarbonate resin, there can be cited LeXan (registered trademark) ML9103 (product name, manufactured by SABIC, with refractive index of 1.59), EP5000 (product name, manufactured by MITSUBISHI GAS CHEMICAL COMPANY, INC., with refractive index of 1.63), SP3810 (product name, manufactured by Teijin Chemicals Ltd., with refractive index of 1.63), SP1516 (product name, manufactured by Teijin Chemicals Ltd., with refractive index 1.60), TS2020 (product name, manufactured by Teijin Chemicals Ltd., with refractive index of 1.59), and xylex (registered trademark) 7507 (product name, manufactured by SABIC), and as the polycycloolefin resin, there can be cited ARTON (registered trademark) (product name, manufactured by JSR Corporation, with refractive index of 1.51), ZEONEX (registered trademark) (product name, manufactured by ZEON CORPORATION, with refractive index of 1.53), and the like.

The absorbing layer 12 can be formed in a manner that, for example, a coating liquid is prepared by dissolving or dispersing the ultraviolet absorber U, the near-infrared absorber A, the transparent resin or the raw material component of the transparent resin, and each component compounded according to need in a solvent, the transparent substrate 11 is coated with this coating liquid to be dried, and further cured according to need.

The solvent for dissolving or dispersing the ultraviolet absorber U, the near-infrared absorber A, the transparent resin, and the like, is not particularly limited as long as it is a dispersion medium capable of stably dispersing or a solvent capable of dissolving the ultraviolet absorber U, the near-infrared absorber A, the transparent resin or the raw material component of the transparent resin, and each component compounded according to need. Note that in the present specification, a term of "solvent" is used as a concept including both of the dispersion medium and the solvent. As the solvent, there can be cited, for example, alcohols such as methanol, ethanol, n-propylalcohol, isopropylalcohol, n-butylalcohol, diacetonealcohol, ethylcellosolve, methylcellosolve, tridecylalcohol, cyclohexylalcohol, and 2-methylcyclohexylalcohol, glycols such as ethyleneglycol, diethyleneglycol, triethyleneglycol, propyleneglycol, dipropylenealcohol, and glycerine, ketones such as acetone, methylethylketone, methylisobutylketone, cyclopentanone, cyclohexanone, isophorone, and diacetonealcohol, amides such as N,N-dimethylformamide, and N,N-dimethylacetamide, sulfoxides such as dimethylsulfoxide, ethers such as tetrahydrofuran, dioxane, dioxolane, diethylether, ethyleneglycolmonomethylether, ethyleneglycol monoethylene ether, ethyleneglycolmonobutylether, diethyleneglycolmonomethylether, diethyleneglycolmonoethylether, diethyleneglycolbutylether, ethyleneglycolmonomethyletheracetate, ethyl eneglycolmonoethyletheracetate, and ethyleneglycolmonobutyletheracetate, esters such as methyl acetate, ethyl acetate, and butyl acetate, aliphatic halogenated hydrocarbons such as chloroform, methylene chloride, dichloroethylene, carbon tetrachloride, and trichloroethylene, aromatic series such as benzene, toluene, xylene, monochlorobenzene, and dichlorobenzene, or aliphatic hydrocarbons such as n-hexane, n-heptane, and cyclohexanoligroin, fluorine-based solvents such as tetrafluoropropylalcohol and pentafluoropropylalcohol, and the like. One kind of these solvents may be used solely or two kinds or more thereof may be mixed and used.

An amount of the solvent is preferably 10 parts by mass to 5000 parts by mass, and more preferably 30 parts by mass to 2000 parts by mass to 100 parts by mass of the transparent resin or the raw material component of the transparent resin. Note that a content of a nonvolatile component (a solid content) in the coating liquid is preferably 2 mass % to 50 mass %, and more preferably 5 mass % to 40 mass % to the entire coating liquid.

It is possible that a surface active agent is contained in the coating liquid. When the surface active agent is contained, it is possible to improve an appearance, in particular, voids resulting from fine bubbles, dents caused by adhesion of foreign substances or the like, and crawling at a drying process. The surface active agent is not particularly limited, and it is possible to arbitrarily use publicly-known one such as cationic, anionic, nonionic surface active agent, and the like.

A solid content concentration of the transparent resin, the ultraviolet absorber U, the near-infrared absorber A, and so on in the coating liquid is generally within a range of 10 mass % to 60 mass %, although depending on a coating method of the coating liquid. When the solid content concentration is too low, coating unevenness easily occurs. On the contrary, when the solid content concentration is too high, a coating appearance is easily deteriorated.

When coating the coating liquid, it is possible to employ a coating method such as, for example, an immersion coating method, a cast coating method, a spray coating method, a spinner coating method, a bead coating method, a wire bar coating method, a blade coating method, a roller coating method, a curtain coating method, a slit-die coater method, a gravure coater method, a slit reverse coater method, a microgravure method, an inkjet method, a comma coater method, or the like. It is also possible to employ, other than the above, a bar coater method, a screen printing method, a flexographic printing, or the like.

By applying the aforementioned coating liquid on the transparent substrate 11 and then drying it, the absorbing layer 12 is formed. For the drying, it is possible to employ a publicly-known method such as heat drying or hot-air drying. When the coating liquid contains the raw material component of the transparent resin, curing is further performed. When the reaction is thermal-curing, it is possible to simultaneously perform the drying and the curing, but, when the reaction is photo-curing, a curing process is provided separately from the drying.

Note that it is also possible that the absorbing layer 12 formed by applying the aforementioned coating liquid on a releasable supporting substrate, which is different from the transparent substrate 11, is released from the supporting substrate to be adhered onto the transparent substrate 11. The releasable supporting substrate may be in a film state or a plate state, and a material thereof is not particularly limited as long as it has releasability. Concretely, a glass plate, a plastic film subjected to release treatment, for example, a film made of a polyester resin such as polyethyleneterephthalate (PET) or polybutyleneterephthalate (PBT), a polyolefin resin such as polyethylene, polypropylene, or an ethylene-vinyl acetate copolymer, an acrylic resin such as polyacrylate or polymethylmethacrylate, an urethane resin, a vinyl chloride resin, a fluorocarbon resin, a polycarbonate resin, a polyvinylbutyral resin, a polyvinylalcohol resin, or the like, a stainless steel plate, or the like is used.

Further, the absorbing layer 12 can also be manufactured in a film state by extrusion molding, depending on a kind of the transparent resin, and furthermore, it is also possible that a plurality of films manufactured as above are stacked to be integrated by thermocompression bonding or the like. Thereafter, these are adhered onto the transparent substrate 11.

Note that when applying the coating liquid, it is also possible to perform preprocessing on the transparent substrate 11 (or the releasable substrate). As a preprocessing agent, there can be used aminosilanes such as γ-aminopropyltriethoxysilane, N-β-(aminoethyl)-γ-aminopropyltrimethoxysilane, N-β-(aminoethyl)-N'-β-(aminoethyl)-γ-aminopropyltriethoxysilane, and γ-anilinopropyltrimethoxysilane, epoxysilanes such as γ-glycidoxypropyltrimethoxysilane, and β-(3,4-epoxycyclohexyl)ethyltrimethoxysilane, vinylsilanes such as vinyltrimethoxysilane, and N-β-(N-vinylbenzylaminoethyl)-γ-aminopropyltrimethoxysilane, γ-methacryloxypropyltrimethoxysilane, γ-chloropropyltrimethoxysilane, γ-mercaptopropyltrimethoxysilane, (3-ureidopropyl)trimethoxysilane, and the like. One kind of these agents may be used solely or two kinds or more thereof may be mixed and used.

(Reflecting Layer)

The reflecting layer 13 is formed of a dielectric multilayer film in which a dielectric film with a low refractive index and a dielectric film with a high refractive index are alternately stacked. Here, the low refractive index and the high refractive index mean to have a low refractive index and a high refractive index with respect to a refractive index of an adjacent layer.

The dielectric film with the high refractive index has the refractive index of preferably 1.6 or more, and more preferably 2.2 to 2.5. As a material of the dielectric film with the high refractive index, there can be cited, for example, $Ta_2O_5$, $TiO_2$, and $Nb_2O_5$. Among them, $TiO_2$ is preferable in terms of reproducibility in film formability, the refractive index and so on, stability, and the like.

On the other hand, the dielectric film with the low refractive index has the refractive index of preferably less than 1.6, more preferably 1.45 or more and less than 1.55, and still more preferably 1.45 to 1.47. As a material of the dielectric film with the low refractive index, there can be cited, for example, $SiO_2$, $SiO_xN_y$, and the like. $SiO_2$ is preferable in terms of reproducibility in the film formability, stability, economic efficiency, and the like.

The reflecting layer 13 exhibits a function of controlling transmission and blocking of light in a specific wavelength range by utilizing interference of light, and the transmission/blocking characteristic thereof has incidence angle dependence. Generally, regarding a wavelength of light blocked by reflection, a wavelength of diagonally incident light becomes shorter than a wavelength of vertically incident light (with incident angle of 0°).

In the present embodiment, in a spectral transmittance curve when an incident angle is 0°, transmittance at a wavelength of 420 to 695 nm of the dielectric multilayer film forming the reflecting layer 13 is preferably 85% or more, more preferably 90% or more, and still more preferably 95% or more. Further, in the spectral transmittance curve when the incident angle is 0°, transmittance at a wavelength of 350 to 400 nm is preferably 5% or less, more preferably 3% or less, and still more preferably 1% or less. Further, in the spectral transmittance curve when the incident angle is 0°, transmittance at a wavelength of 735 to 1100 nm is preferably 5% or less, more preferably 3% or less, and still more preferably 1% or less.

Further, it is preferable that the transmittance of the dielectric multilayer film steeply changes in a boundary wavelength range between a light transmission wavelength and a light-blocking wavelength. In order to achieve the purpose, the total stack number of the dielectric film with the low refractive index and the dielectric film with the high refractive index of the dielectric multilayer film is preferably 15 layers or more, more preferably 25 layers or more, and still more preferably 30 layers or more. However, when the total stack number increases, warpage of the dielectric multilayer film or the like occurs, and further, a film thickness of the dielectric multilayer film increases.

Accordingly, the total stack number is preferably 100 layers or less, more preferably 75 layers or less, and still more preferably 60 layers or less. Regarding a stacking order of the low-refractive-index dielectric film and the high-refractive-index dielectric film, the first layer may be either the low-refractive-index dielectric film or the high-refractive-index dielectric film, as long as they are alternately stacked.

As the film thickness of the dielectric multilayer film, the thinner the more preferable from the viewpoint of reduction in thickness of the optical filter while satisfying the above-described preferable stack number. The film thickness of such a dielectric multilayer film is preferably 2 μm to 10 μm, although depending on selected wavelength blocking characteristics.

When forming the dielectric multilayer film, it is possible to employ, for example, a CVD method, a sputtering method, a vacuum film formation process such as a vacuum deposition method, a spray method, a wet film formation process such as a dip method, or the like.

Note that it is also possible to design such that a single reflecting layer 13 is provided to have predetermined reflection properties as in the present embodiment, or a plurality of reflecting layers 13 are provided to have the predetermined reflection properties. When the plurality of layers are provided, they may be provided on one side of the transparent substrate 11, or provided on both sides of the transparent substrate 11 so as to sandwich the substrate.

The configuration of the present filter is not particularly limited except that it includes the transparent substrate 11, the absorbing layer 12, and the reflecting layer 13. Therefore, it is also possible to add other components. As the other components, there can be cited, for example, inorganic fine particles controlling transmission and absorption of light in a specific wavelength range, and the like. As concrete examples of the inorganic fine particles, there can be cited ITO (Indium Tin Oxides), ATO (Antimony-doped Tin Oxides), cesium tungstate, lanthanum boride, and the like. ITO fine particles and cesium tungstate fine particles have high transmittance of light in the visible light range and have light absorbency in a wide range including the infrared wavelength range over 1200 nm, and thus are preferable when a light blocking property in the infrared wavelength range as described above is needed.

The present filter can be used as an NIR filter of an imaging device such as a digital still camera, a digital video camera, a monitoring camera, an on-vehicle camera, or a web camera, an automatic exposure meter, or the like. The present filter is suitably used in the above-described imaging device, and can be disposed between an imaging lens and a solid-state image sensor, between the imaging lens and a window member of a camera, or at both of them, for example. Further, as described above, the present filter may be configured such that the imaging lens and the window member of the camera are made to be the transparent substrates, and the infrared absorbing layer is provided on one principle surface side thereof.

Further, the present filter can also be used by being directly adhered to the solid-state image sensor of the imaging device, a light-receiving element of the automatic exposure meter, the imaging lens, or the like via an adhesive layer. Furthermore, the present filter can also be used by being directly adhered to a glass window or a lamp of a vehicle (automobile or the like) via the adhesive layer, in a similar manner.

EXAMPLES

Next, the present invention will be described more concretely by using examples, but, the present invention is not limited in any way to the examples.

[Evaluation]
Transmittance in each example was calculated by measuring a spectral transmittance curve with the use of an ultraviolet-visible spectrophotometer (U-4100 type, manufactured by Hitachi High-Technologies Corporation).

The absorbers U used in the respective examples, formula numbers corresponding to the absorbers, and values of $\lambda_{max}$(UV), the wavelength $\lambda_{L90}$, the wavelength $\lambda_{L50}$, and $\lambda_{L90}-\lambda_{L50}$ the absorbers U dissolved in dichloromethane, are represented in Table 3. In Table 3, (U15) indicates an indole compound represented by the following formula (U15), and (U18) indicates a benzotriazole compound represented by the following formula (U18).

As the absorbers A, the squarylium-based dye (A1, corresponding to A11-14 in the specification), and the cyanine-based dye (A2, product name: S2137, manufactured by Few Chemicals GmbH), were used.

TABLE 3

| Formula Number | Ultraviolet Absorber U | λmax (UV) [nm] | $\lambda_{L50}$ [nm] | $\lambda_{L90}$ [nm] | $\lambda_{L90} - \lambda_{L50}$ [nm] |
|---|---|---|---|---|---|
| U1 | Uvitex OB | 396 | 408 | 415 | 7 |
| U2 | S0511 | 396 | 408 | 417 | 9 |
| U3 | SMP370 | 403 | 414 | 423 | 9 |
| U4 | Hakkol RF-K | 372 | 404 | 413 | 9 |
| U5 | Nikkafluor EFS | 377 | 411 | 420 | 9 |
| U6 | Nikkafluor SB-conc | 395 | 408 | 415 | 7 |
| U7 | Lumogen F violet 570 | 393 | 406 | 413 | 7 |
| U8 | N-1 | 384 | 393 | 400 | 7 |
| U9 | N-2 | 384 | 393 | 401 | 8 |
| U10 | N-3 | 385 | 394 | 401 | 7 |
| U11 | N-4 | 385 | 394 | 401 | 7 |
| U12 | M-2 | 396 | 409 | 418 | 9 |
| U13 | M-9 | 379 | 392 | 401 | 9 |
| U14 | M-8 | 390 | 404 | 413 | 9 |
| U15 | Alpha-cyano-3-indoleacrylonitrile | 383 | 413 | 441 | 28 |
| U16 | Tinuvine 326 | 352 | 387 | 403 | 16 |
| U17 | Tinuvine 460 | 348 | 371 | 385 | 14 |
| U18 | (5-tert-Butyl-2-hydroxyphenyl)-2H-benzotriazole | 339 | 369 | 394 | 25 |

[Chemical formula 12]

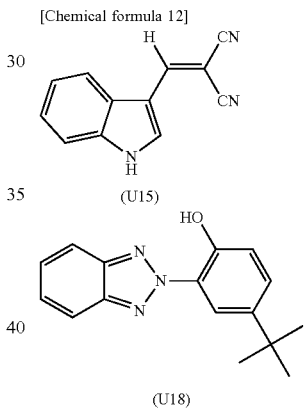

(1) Evaluation of Steepness Regarding Absorber U in Transparent Resin

In the following, it is indicated that the ultraviolet absorber U satisfying the requirement (iv-2) exhibits excellent steepness even in a case where it is contained in the transparent resin. As represented in Table 3, the ultraviolet absorbers (U1) to (U14) satisfy each of the aforementioned requirements (iv-1) and (iv-2) of the ultraviolet absorber U. On the other hand, the ultraviolet absorber (U15) does not satisfy the aforementioned requirement (iv-2). Further, the ultraviolet absorbers (U16) to (U18) do not satisfy both of the aforementioned requirements (iv-1) and (iv-2).

a. Production and Evaluation of Transparent Resin Samples (I)
As represented in Table 4, any one of the ultraviolet absorbers (U1) to (U18) and a 15 mass % cyclohexanone solution of the polyester resin (product name: B-OKP2, manufactured by Osaka Gas Chemicals Co., Ltd., with refractive index of 1.64) were mixed, and stirred and dissolved at room temperature to obtain a coating liquid. In any of the examples, the absorber U was mixed by a content which causes the transmittance to be 10% at the absorption peak wavelength $\lambda_{Max-P}$(UV) of the absorber U.

The coating liquid obtained above was applied onto a transparent substrate (product name: AN100, manufactured by ASAHI GLASS CO., LTD.) by a spin coat method, and heated and dried to form an absorbing layer with a thickness of 3.0 μm, thereby obtaining each of transparent resin samples (Example 2-1 to Example 2-18). Table 4 represents results obtained by measuring spectral transmittance curves (when the incident angle is 0°) regarding the produced transparent resin samples. $\lambda_{max\text{-}P}(UV)$ in Table 4 indicates a absorption peak wavelength of each transparent resin sample. Regarding each transparent resin sample, when the absorber U is dissolved in an amount which causes transmittance at the aforementioned absorption peak wavelength $\lambda_{max\text{-}P}(UV)$ to be 10%, $\lambda_{50}$ and $\lambda_{90}$ indicate wavelengths with transmittance of 50% and transmittance of 90%, respectively, at a wavelength longer than the aforementioned absorption peak wavelength $\lambda_{max\text{-}P}(UV)$ and equal to or less than a wavelength of 500 nm.

Values indicated in Table 4 are values obtained by subtracting transmittance of a glass plate and the like from the spectral transmittance curves of the transparent resin samples. Concretely, they are values obtained by calculating reflection on an absorbing layer-air interface by subtracting influences of absorption of the glass plate and reflection on the glass plate-absorbing layer interface and the glass plate-air interface. Note that Table 5 to be described next and Tables to be described thereafter also indicate values calculated in a manner similar to Table 4.

TABLE 4

| Example | Resin/ Film Thickness | Ultraviolet Absorber U | $\lambda_{max\text{-}P}(UV)$ [nm] | $\lambda_{P50}$ [nm] | $\lambda_{P90}$ [nm] | $\lambda_{P90} - \lambda_{P50}$ [nm] |
|---|---|---|---|---|---|---|
| 2-1 | B-OKP2 | U1 | 400 | 414 | 422 | 8 |
| 2-2 | (Polyester resin) | U2 | 400 | 415 | 426 | 11 |
| 2-3 | 3.0 μm | U3 | 408 | 421 | 432 | 11 |
| 2-4 | | U4 | 381 | 415 | 424 | 9 |
| 2-5 | | U5 | 384 | 419 | 429 | 10 |
| 2-6 | | U6 | 382 | 414 | 423 | 9 |
| 2-7 | | U7 | 396 | 410 | 419 | 9 |
| 2-8 | | U8 | 387 | 397 | 406 | 9 |
| 2-9 | | U9 | 385 | 396 | 405 | 9 |
| 2-10 | | U10 | 388 | 399 | 408 | 9 |
| 2-11 | | U11 | 388 | 399 | 408 | 9 |
| 2-12 | | U12 | 401 | 415 | 426 | 11 |
| 2-13 | | U13 | 383 | 397 | 407 | 10 |
| 2-14 | | U14 | 394 | 410 | 425 | 11 |
| 2-15 | | U15 | 391 | 426 | 479 | 53 |
| 2-16 | | U16 | 356 | 392 | 409 | 17 |
| 2-17 | | U17 | 356 | 392 | 409 | 17 |
| 2-18 | | U18 | 339 | 374 | 390 | 16 |

From Table 4, among the Examples 2-1 to 2-18, the value of $\lambda_{90}-\lambda_{50}$ of each of the Example 2-1 to the Example 2-14 containing the ultraviolet absorbers (U1) to (U14) is 8 to 11 nm. On the other hand, the value of $\lambda_{90}-\lambda_{50}$ of each of the Example 2-15 to the Example 2-18 containing the ultraviolet absorbers (U15) to (U18) was 16 to 53 nm. From the above description, it can be understood that in the Examples using the polyester resin, the Example containing the absorber U satisfying the requirement (iv-2) has a small value of $\lambda_{90}-\lambda_{50}$ also as the resin film (absorbing layer), and the Example containing the absorber which does not satisfy the requirement (iv-2) has a large value of $\lambda_{90}-\lambda_{50}$ also as the resin film (absorbing layer).

b. Production and Evaluation of Transparent Resin Samples (II)

As transparent resins, transparent resin samples of Example 3-1 to Example 3-14 were produced in a similar manner to the Example 2-1 to the Example 2-18, except that the polyester resin (product name: OKP850, manufactured by Osaka Gas Chemicals Co., Ltd., with refractive index of 1.65) was used. Table 5 represents results obtained by measuring spectral transmittance curves (when the incident angle is 0°) regarding the produced transparent resin samples.

TABLE 5

| Example | Resin/ Film Thickness | Ultraviolet Absorber U | $\lambda_{max\text{-}P}(UV)$ [nm] | $\lambda_{P50}$ [nm] | $\lambda_{P90}$ [nm] | $\lambda_{P90} - \lambda_{P50}$ [nm] |
|---|---|---|---|---|---|---|
| 3-1 | OKP850 | U1 | 401 | 415 | 423 | 8 |
| 3-2 | (Polyester resin) | U2 | 401 | 416 | 427 | 11 |
| 3-3 | 1.0 μm | U4 | 381 | 415 | 429 | 14 |

TABLE 5-continued

| Example | Resin/<br>Film Thickness | Ultraviolet<br>Absorber U | $\lambda_{max\text{-}P}$(UV)<br>[nm] | $\lambda_{P50}$<br>[nm] | $\lambda_{P90}$<br>[nm] | $\lambda_{P90} - \lambda_{P50}$<br>[nm] |
|---|---|---|---|---|---|---|
| 3-4 | | U6 | 383 | 414 | 423 | 9 |
| 3-5 | | U8 | 388 | 399 | 409 | 10 |
| 3-6 | | U9 | 385 | 397 | 407 | 10 |
| 3-7 | | U10 | 389 | 401 | 412 | 11 |
| 3-8 | | U11 | 389 | 401 | 413 | 12 |
| 3-9 | | U12 | 401 | 416 | 427 | 11 |
| 3-10 | | U13 | 383 | 398 | 408 | 10 |
| 3-11 | | U15 | 388 | | NA | |
| 3-12 | | U16 | 353 | 367 | 402 | 35 |
| 3-13 | | U17 | 353 | 370 | 391 | 21 |
| 3-14 | | U18 | 353 | 367 | 384 | 17 |

From Table 5, among the Examples 3-1 to 3-14, the value of $\lambda_{90}-\lambda_{50}$ of each of the Example 3-1 to the Example 3-10 containing the respective ultraviolet absorbers is 8 to 14 nm. On the other hand, in each of the Example 3-11 to the Example 3-14 containing the ultraviolet absorbers (U15) to (U18), the value of $\lambda_{90}-\lambda_{50}$ was 17 to 35 nm, or it was not possible to obtain the applicable value.

c. Production and Evaluation of Transparent Resin Samples (III)

As transparent resins, transparent resin samples of Example 4-1 to Example 4-18 were produced in a similar manner to the Example 2-1 to the Example 2-18, except that the polycarbonate resin (product name: SP3810, manufactured by Teijin Chemicals Ltd., with refractive index of 1.63) was used. Table 6 represents results obtained by measuring spectral transmittance curves (when the incident angle is 0°) regarding the produced transparent resin samples.

TABLE 6

| Example | Resin/<br>Film Thickness | Ultraviolet<br>Absorber U | $\lambda_{max\text{-}P}$(UV)<br>[nm] | $\lambda_{P50}$<br>[nm] | $\lambda_{P90}$<br>[nm] | $\lambda_{P90} - \lambda_{P50}$<br>[nm] |
|---|---|---|---|---|---|---|
| 4-1 | SP3810 | U1 | 399 | 413 | 422 | 9 |
| 4-2 | (Polycarbonate) | U2 | 399 | 414 | 424 | 10 |
| 4-3 | 3.0 μm | U3 | 408 | 421 | 432 | 11 |
| 4-4 | | U4 | 380 | 413 | 423 | 10 |
| 4-5 | | U5 | 383 | 419 | 429 | 10 |
| 4-6 | | U6 | 381 | 413 | 422 | 9 |
| 4-7 | | U7 | 395 | 409 | 418 | 9 |
| 4-8 | | U8 | 386 | 397 | 407 | 10 |
| 4-9 | | U9 | 384 | 395 | 405 | 10 |
| 4-10 | | U10 | 388 | 399 | 408 | 9 |
| 4-11 | | U11 | 388 | 399 | 408 | 9 |
| 4-12 | | U12 | 400 | 414 | 424 | 10 |
| 4-13 | | U13 | 383 | 397 | 406 | 9 |
| 4-14 | | U14 | 394 | 409 | 422 | 11 |
| 4-15 | | U15 | 389 | 424 | 482 | 58 |
| 4-16 | | U16 | 354 | 391 | 410 | 19 |
| 4-17 | | U17 | 351 | 376 | 392 | 16 |
| 4-18 | | U18 | 333 | 373 | 390 | 17 |

From Table 6, among the Example 4-1 to the Example 4-18, the value of $\lambda_{90}-\lambda_{50}$ of each of the Example 4-1 to the Example 4-14 containing the ultraviolet absorbers (U1) to (U14) is 9 to 11 nm. On the other hand, the value of $\lambda_{90}-\lambda_{50}$ of each of the Example 4-15 to the Example 4-18 containing the ultraviolet absorbers (U15) to (U18) was 17 to 58 nm. From the above description, it can be understood that in the Examples using the polycarbonate resin, the Example containing the absorber U satisfying the requirement (iv-2) has a small value of $\lambda_{90}-\lambda_{50}$ also as the resin film (absorbing layer), and the Example containing the absorber which does not satisfy the requirement (iv-2) has a large value of $\lambda_{90}-\lambda_{50}$ also as the resin film (absorbing layer).

d. Production and Evaluation of Transparent Resin Samples (IV)

As transparent resins, transparent resin samples of Example 5-1 to Example 5-18 were produced in a similar manner to the Example 2-1 to the Example 2-18, except that the polycarbonate resin (product name: EP5000, manufactured by MITSUBISHI GAS CHEMICAL COMPANY, INC., with refractive index of 1.63) was used. Table 7 represents results obtained by measuring spectral transmittance curves (when the incident angle is 0°) regarding the produced transparent resin samples.

TABLE 7

| Example | Resin/<br>Film Thickness | Ultraviolet<br>Absorber U | $\lambda_{max\text{-}P}$(UV)<br>[nm] | $\lambda_{P50}$<br>[nm] | $\lambda_{P90}$<br>[nm] | $\lambda_{P90} - \lambda_{P50}$<br>[nm] |
|---|---|---|---|---|---|---|
| 5-1 | EP5000 | U1 | 400 | 413 | 423 | 10 |
| 5-2 | (Polycarbonate) | U2 | 399 | 413 | 423 | 10 |
| 5-3 | 3.0 μm | U3 | 408 | 421 | 433 | 12 |
| 5-4 | | U4 | 379 | 413 | 423 | 10 |

TABLE 7-continued

| Example | Resin/ Film Thickness | Ultraviolet Absorber U | $\lambda_{max \cdot P}$(UV) [nm] | $\lambda_{P50}$ [nm] | $\lambda_{P90}$ [nm] | $\lambda_{P90} - \lambda_{P50}$ [nm] |
|---|---|---|---|---|---|---|
| 5-5 | | U5 | 383 | 418 | 429 | 11 |
| 5-6 | | U6 | 381 | 413 | 421 | 8 |
| 5-7 | | U7 | 395 | 409 | 421 | 12 |
| 5-8 | | U8 | 386 | 397 | 406 | 9 |
| 5-9 | | U9 | 384 | 395 | 405 | 10 |
| 5-10 | | U10 | 388 | 399 | 409 | 10 |
| 5-11 | | U11 | 388 | 399 | 408 | 9 |
| 5-12 | | U12 | 400 | 414 | 424 | 10 |
| 5-13 | | U13 | 383 | 396 | 406 | 10 |
| 5-14 | | U14 | 393 | 409 | 421 | 12 |
| 5-15 | | U15 | 388 | 430 | 494 | 64 |
| 5-16 | | U16 | 354 | 391 | 412 | 21 |
| 5-17 | | U17 | 351 | 376 | 392 | 16 |
| 5-18 | | U18 | 339 | 373 | 397 | 24 |

From Table 7, among the Examples 5-1 to 5-18, the value of $\lambda_{90}-\lambda_{50}$ of each of the Example 5-1 to the Example 5-14 containing the ultraviolet absorbers (U1) to (U14) is 9 to 12 nm. On the other hand, the value of $\lambda_{90}-\lambda_{50}$ of each of the Example 5-15 to the Example 5-18 containing the ultraviolet absorbers (U15) to (U18) was 16 to 64 nm. From the above description, it can be understood that in the Examples using the polycarbonate resin, the Example containing the absorber U satisfying the requirement (iv-2) has a small value of $\lambda_{90}-\lambda_{50}$ also as the resin film (absorbing layer), and the Example containing the absorber which does not satisfy the requirement (iv-2) has a large value of $\lambda_{90}-\lambda_{50}$ also as the resin film (absorbing layer).

e. Production and Evaluation of Transparent Resin Samples (V)

As transparent resins, transparent resin samples of Example 6-1 to Example 6-16 were produced in a similar manner to the Example 2-1 to the Example 2-18, except that the acrylic resin (product name: BR50, manufactured by Mitsubishi Rayon Co., Ltd., with refractive index of 1.56) was used. Table 8 represents results obtained by measuring spectral transmittance curves (when the incident angle is 0°) regarding the produced transparent resin samples.

From Table 8, among the Example 6-1 to the Example 6-16, the value of $\lambda_{90}-\lambda_{50}$ of each of the Example 6-1 to the Example 6-12 containing the respective ultraviolet absorbers is 9 to 11 nm. On the other hand, in each of the Example 6-13 to the Example 6-16 containing the ultraviolet absorbers (U15) to (U18), the value of $\lambda_{90}-\lambda_{50}$ was 15 to 70 nm, or it was not possible to obtain the applicable values.

f. Production and Evaluation of Transparent Resin Samples (VI)

As transparent resins, transparent resin samples of Example 7-1 to Example 7-16 were produced in a similar manner to the Example 2-1 to the Example 2-18, except that the polycycloolefin resin (product name: ARTON (registered trademark), manufactured by JSR Corporation, with refractive index of 1.51) was used. Table 9 represents results obtained by measuring spectral transmittance curves (when the incident angle is 0°) regarding the produced transparent resin samples.

TABLE 8

| Example | Resin/ Film Thickness | Ultraviolet Absorber U | $\lambda_{max \cdot P}$(UV) [nm] | $\lambda_{P50}$ [nm] | $\lambda_{P90}$ [nm] | $\lambda_{P90} - \lambda_{P50}$ [nm] |
|---|---|---|---|---|---|---|
| 6-1 | BR50 | U1 | 398 | 410 | 419 | 9 |
| 6-2 | (Acrylic resin) | U2 | 398 | 412 | 421 | 9 |
| 6-3 | 2.5 μm | U4 | 378 | 411 | 420 | 9 |
| 6-4 | | U5 | 383 | 416 | 426 | 10 |
| 6-5 | | U6 | 379 | 410 | 419 | 9 |
| 6-6 | | U7 | 393 | 405 | 416 | 11 |
| 6-7 | | U8 | 385 | 395 | 404 | 9 |
| 6-8 | | U9 | 385 | 394 | 403 | 9 |
| 6-9 | | U10 | 386 | 397 | 407 | 10 |
| 6-10 | | U11 | 386 | 397 | 406 | 9 |
| 6-11 | | U12 | 399 | 413 | 422 | 9 |
| 6-12 | | U13 | 381 | 396 | 406 | 10 |
| 6-13 | | U15 | 384 | 460 | 530 | 70 |
| 6-14 | | U16 | | | NA | |
| 6-15 | | U17 | 349 | 374 | 389 | 15 |
| 6-16 | | U18 | | | NA | |

TABLE 9

| Example | Resin/film Thickness | Ultraviolet Absorber U | $\lambda_{max\text{-}P}$(UV) [nm] | $\lambda_{P50}$ [nm] | $\lambda_{P90}$ [nm] | $\lambda_{P90} - \lambda_{P50}$ [nm] |
|---|---|---|---|---|---|---|
| 7-1 | ARTON | U1 | 397 | 408 | 416 | 8 |
| 7-2 | (Polycycloolefin | U2 | 397 | 411 | 422 | 11 |
| 7-3 | resin) | U4 | 377 | 408 | 417 | 9 |
| 7-4 | 1.7 μm | U5 | 381 | 414 | 424 | 10 |
| 7-5 |  | U6 | 377 | 408 | 416 | 8 |
| 7-6 |  | U7 | 391 | 402 | 412 | 10 |
| 7-7 |  | U8 | 383 | 393 | 401 | 8 |
| 7-8 |  | U9 | 383 | 392 | 401 | 9 |
| 7-9 |  | U10 | 385 | 394 | 403 | 9 |
| 7-10 |  | U11 | 384 | 394 | 403 | 9 |
| 7-11 |  | U12 | 398 | 412 | 422 | 10 |
| 7-12 |  | U13 | 382 | 396 | 408 | 12 |
| 7-13 |  | U15 |  | NA |  |  |
| 7-14 |  | U16 |  | NA |  |  |
| 7-15 |  | U17 | 349 | 373 | 388 | 15 |
| 7-16 |  | U18 |  | NA |  |  |

From Table 9, among the Example 7-1 to the Example 7-16, the value of $\lambda_{90}-\lambda_{50}$ of each of the Example 7-1 to the Example 7-12 containing the respective ultraviolet absorbers is 9 to 12 nm. On the other hand, in each of the Example 7-13 to the Example 7-16 containing the ultraviolet absorbers (U15) to (U18), the value of $\lambda_{90}-\lambda_{50}$ was 15 nm, or it was not possible to obtain the applicable values.

As described above, in each of the transparent resins of the polyester resin OKP850, the polycarbonate resins SP3810 and EP5000, the acrylic resin BR50, and the polycycloolefin resin ARTON (registered trademark), it is possible to obtain the result having a tendency similar to that of the polyester resin B-OKP2. Therefore, it can be understood that in the Examples containing the absorbers (U1) to (U14) each satisfying the requirement (iv-2), the value of $\lambda_{90}-\lambda_{50}$ is small also as the resin film, and in the Examples containing the absorbers (U15) to (U18) each of which does not satisfy the requirement (iv-2), the value of $\lambda_{90}-\lambda_{50}$ becomes large also as the resin film. From the above description, it can be said that the absorber U satisfying the requirement (iv-2) exhibits steepness also when it is contained in the transparent resin.

(2) Evaluation of Optical Filter (Optical Characteristics)
[Design of Reflecting Layer]

Regarding the reflecting layer, a silica ($SiO_2$, refractive index of 1.46) layer and a titania ($TiO_2$, refractive index of 2.41) layer are alternately stacked, by a vapor deposition method, on a glass (product name: AN100, manufactured by ASAHI GLASS CO., LTD.) substrate with a thickness of 0.3 mm, to thereby form the reflecting layer 13 (34 layers) with a configuration as represented in Table 10. The configuration of the reflecting layer is determined by performing a simulation in which the layer thickness of the silica layer, the layer thickness of the titania layer, and the stack number of the reflecting layers 13 are set as parameters, and setting that in the spectral transmittance curve when the incident angle is 0°, the transmittance at the wavelength of 420 to 695 nm becomes 90% or more, the transmittance at the wavelength of 350 to 400 nm becomes 5% or less, and the transmittance at the wavelength of 735 to 1100 nm becomes 5% or less.

TABLE 10

| Layer | Material | Physical film thickness (nm) |
|---|---|---|
| 1 | $TiO_2$ | 15.13 |
| 2 | $SiO_2$ | 32.83 |
| 3 | $TiO_2$ | 112.21 |
| 4 | $SiO_2$ | 169.24 |
| 5 | $TiO_2$ | 105.83 |
| 6 | $SiO_2$ | 172.00 |
| 7 | $TiO_2$ | 107.86 |
| 8 | $SiO_2$ | 170.47 |
| 9 | $TiO_2$ | 108.05 |
| 10 | $SiO_2$ | 174.63 |
| 11 | $TiO_2$ | 107.57 |
| 12 | $SiO_2$ | 171.41 |
| 13 | $TiO_2$ | 105.92 |
| 14 | $SiO_2$ | 171.41 |
| 15 | $TiO_2$ | 104.79 |
| 16 | $SiO_2$ | 163.65 |
| 17 | $TiO_2$ | 93.36 |
| 18 | $SiO_2$ | 145.28 |
| 19 | $TiO_2$ | 88.78 |
| 20 | $SiO_2$ | 145.71 |
| 21 | $TiO_2$ | 82.52 |
| 22 | $SiO_2$ | 141.75 |
| 23 | $TiO_2$ | 81.16 |
| 24 | $SiO_2$ | 141.97 |
| 25 | $TiO_2$ | 84.55 |
| 26 | $SiO_2$ | 139.37 |
| 27 | $TiO_2$ | 84.14 |
| 28 | $SiO_2$ | 139.91 |
| 29 | $TiO_2$ | 81.92 |
| 30 | $SiO_2$ | 145.51 |
| 31 | $TiO_2$ | 87.11 |
| 32 | $SiO_2$ | 148.83 |
| 33 | $TiO_2$ | 92.12 |
| 34 | $SiO_2$ | 76.65 |

Results obtained by measuring the spectral transmittance curves (when the incident angles are 0° and 30°) of the light reflecting layer formed of the dielectric multilayer film produced based on the above-described design, and calculating respective optical characteristics from results of the measurement, are represented in Table 11. Note that the wavelength with transmittance of 50% in the wavelength range of 400 to 425 nm, in the spectral transmittance curve when the incident angle is 0° of the reflecting layer was set to $\lambda_0$ (reflecting layer UV), the wavelength with transmittance of 50% in the wavelength range of 400 to 425 nm, in the spectral transmittance curve when the incident angle is 30° was set to $\lambda_{30}$ (reflecting layer UV), the wavelength with transmittance of 50% in the wavelength range of 650 to 750 nm, in the spectral transmittance curve when the incident angle is 0° of the reflecting layer was set to $\lambda_0$ (reflecting layer IR), and the wavelength with transmittance of 50% in the wavelength range of 650 to 750 nm, in the spectral transmittance curve when the incident angle is 30° was set to $\lambda_{30}$ (reflecting layer IR).

TABLE 11

| | Incident angle | |
|---|---|---|
| | 0° | 30° |
| Average transmittance [%] (420-695 nm) | 97.5 | 96.6 |
| Maximum transmittance [%] (350-400 nm) | 1.29 | 71.32 |
| Average transmittance [%] (350-400 nm) | 0.39 | 4.69 |
| Maximum transmittance [%] (735-1100 nm) | 3.07 | 1.74 |
| Average transmittance [%] (735-1100 nm) | 0.17 | 0.24 |
| $\lambda$ (reflecting layer UV) [nm] | 411 | 399 |
| $|\lambda_0$ (reflecting layer UV) - $\lambda_{30}$ (reflecting layer UV)$|$ [nm] | 12 | |
| $\lambda$ (reflecting layer IR) [nm] | 719 | 694 |
| $|\lambda_0$ (reflecting layer IR) - $\lambda_{30}$ (reflecting layer IR)$|$ [nm] | 25 | |

Optical Characteristics of Optical Filter Having Reflecting Layer

Example 9-1 to Example 9-33

The ultraviolet absorber U, or the ultraviolet absorber U and the near-infrared absorber A was (were) mixed with a cyclohexanone solution of the transparent resin at a ratio represented in Table 12 to Table 15, to thereby prepare a coating liquid. The coating liquid was applied onto a glass substrate by the spin coat method, and after the solvent was heated and dried, an absorbing layer was formed. Transmittance of the formed absorbing layer was measured by using the ultraviolet-visible spectrophotometer (U-4100 type, manufactured by Hitachi High-Technologies Corporation), a result thereof was multiplied by the spectral data of the dielectric multilayer film described above, to thereby calculate respective optical characteristics when the incident angles are 0° and 30° of the optical filter having the absorbing layer and the reflecting layer. Results thereof are also represented in Table 12 to Table 15. The Example 9-1 to the Example 9-19 are examples, and the Example 9-20 to the Example 9-33 are comparative examples.

TABLE 12

| | | E9-1 | E9-2 | E9-3 | E9-4 | E9-5 | E9-6 | E9-7 | E9-8 | E9-9 | E9-10 |
|---|---|---|---|---|---|---|---|---|---|---|---|
| Ultraviolet absorber U | Kind of dye | U1 | U1 | U1 | U12 | U12 | U13 | U1 | U1 | U12 | U12 |
| | Addition amount* | 5 | 5 | 5 | 1 | 1 | 12 | 15 | 15 | 3 | 3 |
| Near-infrared absorber A | Kind of dye | — | A2 | A1 | — | A1 | A1 | — | A1 | — | A1 |
| | Addition amount* | — | 3 | 3 | — | 3 | 3 | — | 9 | — | 9 |
| Transparent resin | Kind of resin | B-OKP2 | B-OKP2 | B-OKP2 | B-OKP2 | B-OKP2 | B-OKP2 | OKP850 | OKP850 | OKP850 | OKP850 |
| Optical characteristics | Average transmittance [%] (430-620 nm) | 98.0 | 92.4 | 94.1 | 98.3 | 93.4 | 94.4 | 97.0 | 94.4 | 96.8 | 93.9 |
| | Average transmittance [%] (430-450 nm) | 97.2 | 87.5 | 83.4 | 96.7 | 82.4 | 83.5 | 97.1 | 84.4 | 93.7 | 81.9 |
| | Average transmittance [%] (350-395 nm) | 0.0 | 0.0 | 0.0 | 0.3 | 0.2 | 0.0 | 0.0 | 0.0 | 0.2 | 0.2 |
| | Average transmittance [%] (735-1110 nm) | 0.2 | 0.1 | 0.1 | 0.2 | 0.1 | 0.1 | 0.2 | 0.1 | 0.2 | 0.1 |
| | $\lambda_0$(UV) [nm] | 415 | 415 | 415 | 414 | 418 | 412 | 413 | 415 | 413 | 418 |
| | $\lambda_{30}$(UV) [nm] | 415 | 416 | 416 | 415 | 419 | 411 | 414 | 416 | 414 | 419 |
| | $|\lambda_0$(UV) − $\lambda_{30}$(UV)$|$[nm] | 0 | 1 | 1 | 1 | 1 | 1 | 1 | 1 | 1 | 1 |
| | $\lambda_0$(IR) [nm] | 719 | 642 | 651 | 719 | 649 | 647 | 719 | 653 | 719 | 650 |
| | $\lambda_{30}$(IR) [nm] | 694 | 642 | 651 | 694 | 648 | 646 | 694 | 653 | 694 | 651 |
| | $|\lambda_0$(IR) − $\lambda_{30}$(IR)$|$[nm] | 25 | 0 | 0 | 25 | 1 | 1 | 25 | 0 | 25 | 1 |

*Parts by mass to 100 parts by mass of transparent resin

TABLE 13

| | | E9-11 | E9-12 | E9-13 | E9-14 | E9-15 | E9-16 | E9-17 | E9-18 | E9-19 |
|---|---|---|---|---|---|---|---|---|---|---|
| Ultraviolet absorber U | Kind of dye | U1 | U1 | U1 | U1 | U13 | U1 | U1 | U12 | U12 |
| | Addition amount* | 5 | 5 | 1 | 1 | 15 | 12.5 | 10 | 2.2 | 1 |
| Near-infrared absorber A | Kind of dye | — | A1 | — | A1 | A1 | — | A1 | — | A1 |
| | Addition amount* | — | 3 | — | 3 | 3 | — | 5 | — | 5 |
| Transparent resin | Kind of resin | SP3810 | SP3810 | SP3810 | SP3810 | SP3810 | ARTON | ARTON | ARTON | ARTON |
| Optical characteristics | Average transmittance [%] (430-620 nm) | 98.2 | 94.9 | 97.1 | 94.8 | 95.1 | 98.4 | 93.5 | 98.4 | 93.4 |
| | Average transmittance [%] (430-450 nm) | 97.6 | 84.5 | 95.9 | 84.2 | 85.4 | 98.0 | 80.7 | 97.8 | 80.9 |
| | Average transmittance [%] (350-395 nm) | 0.0 | 0.0 | 0.2 | 0.2 | 0.0 | 0.0 | 0.0 | 0.2 | 0.3 |
| | Average transmittance [%] (735-1110 nm) | 0.2 | 0.1 | 0.2 | 0.1 | 0.1 | 0.2 | 0.1 | 0.2 | 0.1 |
| | $\lambda_0$(UV) [nm] | 413 | 415 | 413 | 415 | 412 | 412 | 413 | 412 | 413 |
| | $\lambda_{30}$(UV) [nm] | 413 | 416 | 414 | 416 | 410 | 411 | 412 | 412 | 413 |
| | $|\lambda_0$(UV) − $\lambda_{30}$(UV)$|$[nm] | 0 | 1 | 1 | 1 | 2 | 1 | 1 | 0 | 0 |
| | $\lambda_0$(IR) [nm] | 719 | 651 | 719 | 652 | 652 | 719 | 640 | 719 | 640 |
| | $\lambda_{30}$(IR) [nm] | 694 | 652 | 694 | 652 | 652 | 694 | 641 | 694 | 640 |
| | $|\lambda_0$(IR) − $\lambda_{30}$(IR)$|$[nm] | 25 | 1 | 25 | 0 | 0 | 25 | 1 | 25 | 0 |

*Parts by mass to 100 parts by mass of transparent resin

TABLE 14

|  |  | E9-20 | E9-21 | E9-22 | E9-23 | E9-24 | E9-25 | E9-26 | E9-27 |
|---|---|---|---|---|---|---|---|---|---|
| Ultraviolet absorber U | Kind of dye | — | — | U15 | U16 | U17 | U15 | U16 | U17 |
|  | Addition amount* | — | — | 5 | 20 | 20 | 15 | 20 | 20 |
| Near-infrared absorber A | Kind of dye | — | A1 | A1 | A1 | A1 | A1 | A1 | A1 |
|  | Addition amount* | — | 3 | 3 | 3 | 3 | 9 | 9 | 9 |
| Transparent resin | Kind of resin | B-OKP2 | B-OKP2 | B-OKP2 | B-OKP2 | B-OKP2 | OKP850 | OKP850 | OKP850 |
| Optical characteristics | Average transmittance [%] (430-620 nm) | 97.7 | 95.0 | 91.7 | 94.7 | 94.2 | 92.5 | 94.1 | 93.3 |
|  | Average transmittance [%] (430-450 nm) | 97.8 | 85.6 | 70.6 | 84.4 | 83.3 | 75.4 | 85.5 | 83.4 |
|  | Average transmittance [%] (350-395 nm) | 0.4 | 0.4 | 0.2 | 0.2 | 0.0 | 0.3 | 0.3 | 0.1 |
|  | Average transmittance [%] (735-1110 nm) | 0.2 | 0.1 | 0.1 | 0.1 | 0.1 | 0.1 | 0.1 | 0.1 |
|  | $\lambda_0$(UV) [nm] | 411 | 411 | 422 | 411 | 411 | 412 | 411 | 411 |
|  | $\lambda_{30}$(UV) [nm] | 399 | 399 | 424 | 400 | 400 | 400 | 399 | 400 |
|  | $|\lambda_0$(UV) $- \lambda_{30}$(UV)$|$[nm] | 12 | 12 | 2 | 11 | 11 | 12 | 12 | 11 |
|  | $\lambda_0$(IR) [nm] | 719 | 655 | 649 | 651 | 648 | 653 | 651 | 650 |
|  | $\lambda_{30}$(IR) [nm] | 694 | 655 | 648 | 651 | 648 | 653 | 651 | 650 |
|  | $|\lambda_0$(IR) $- \lambda_{30}$(IR)$|$[nm] | 25 | 0 | 1 | 0 | 0 | 0 | 0 | 0 |

*Parts by mass to 100 parts by mass of transparent resin

TABLE 15

|  |  | E9-28 | E9-29 | E9-30 | E9-31 | E9-32 | E9-33 |
|---|---|---|---|---|---|---|---|
| Ultraviolet absorber U | Kind of dye | U15 | U16 | U17 | U16 | U17 | U15 |
|  | Addition amount* | 5 | 20 | 20 | 10 | 20 | 20 |
| Near-infrared absorber A | Kind of dye | A1 | A1 | A1 | A1 | A1 | A1 |
|  | Addition amount* | 3 | 3 | 3 | 5 | 5 | 5 |
| Transparent resin | Kind of resin | SP3810 | SP3810 | SP3810 | ARTON | ARTON | ARTON |
| Optical characteristics | Average transmittance [%] (430-620 nm) | 91.5 | 95.1 | 94.7 | 93.5 | 94.6 | 94.9 |
|  | Average transmittance [%] (430-450 nm) | 71.5 | 85.3 | 84.5 | 77.5 | 84.7 | 84.8 |
|  | Average transmittance [%] (350-395 nm) | 0.2 | 0.1 | 0.0 | 0.3 | 0.4 | 0.1 |
|  | Average transmittance [%] (735-1110 nm) | 0.1 | 0.1 | 0.1 | 0.2 | 0.2 | 0.1 |
|  | $\lambda_0$(UV) [nm] | 422 | 411 | 411 | 412 | 411 | 411 |
|  | $\lambda_{30}$(UV) [nm] | 424 | 400 | 400 | 400 | 399 | 400 |
|  | $|\lambda_0$(UV) $- \lambda_{30}$(UV)$|$[nm] | 2 | 11 | 11 | 12 | 12 | 11 |
|  | $\lambda_0$(IR) [nm] | 651 | 654 | 650 | 649 | 649 | 651 |
|  | $\lambda_{30}$(IR) [nm] | 651 | 654 | 650 | 648 | 648 | 651 |
|  | $|\lambda_0$(IR) $- \lambda_{30}$(IR)$|$[nm] | 0 | 0 | 0 | 1 | 1 | 0 |

*Parts by mass to 100 parts by mass of transparent resin

Example 10-1 to Example 10-7

The ultraviolet absorber U, or the ultraviolet absorber U and the near-infrared absorber A was (were) mixed with a 15 mass % cyclohexanone solution of the polyester resin (product name: B-OKP2, manufactured by Osaka Gas Chemicals Co., Ltd., with refractive index of 1.64) at a ratio represented in Table 16, and sufficiently stirred and dissolved to prepare a coating liquid. The coating liquid was applied onto the other principle surface of the above-described glass substrate on which the reflecting layer was formed (a surface on the opposite side of the surface on which the reflecting layer 13 was formed) by the spin coat method, and after the solvent was heated and dried, an absorbing layer with a thickness of 2.7 μm was formed.

Figure 5:
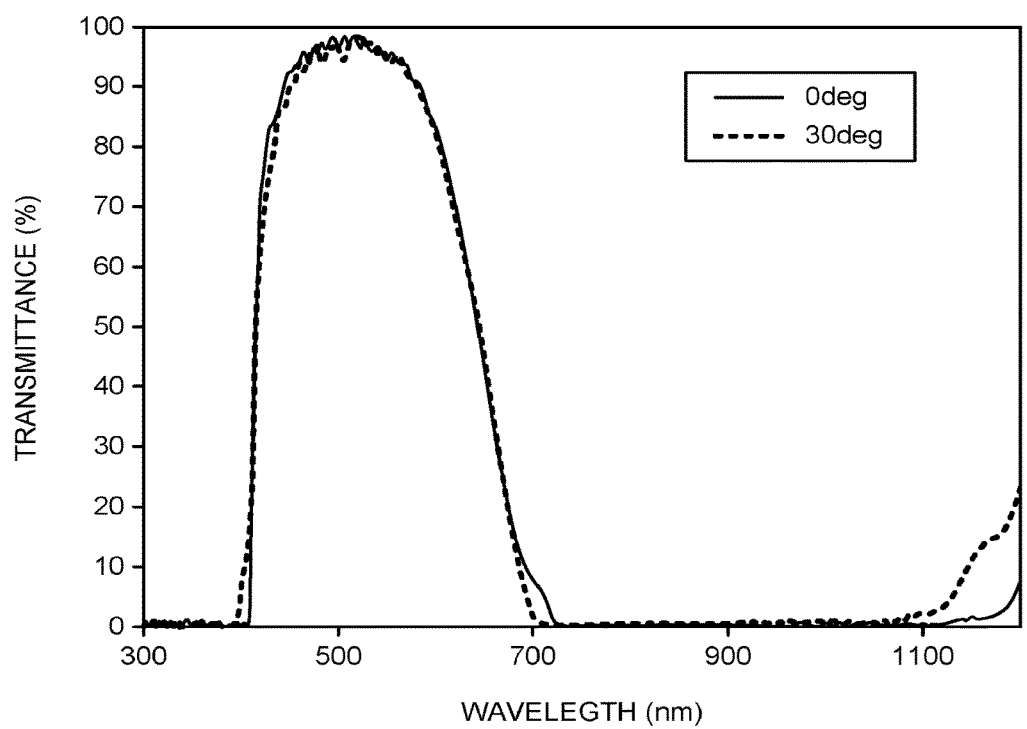
FIG. 5 illustrates spectral transmittance curves measured as for the optical filter obtained in the embodiment of the present invention.

Spectral transmittance curves (when the incident angles are 0° and 30°) of the obtained respective optical filters were measured, and from results of the measurement, respective optical characteristics were calculated. Results thereof are also represented in Table 16. The Example 10-1 to the Example 10-3 are examples, and the Example 10-4 to the Example 10-7 are comparative examples. Further, the spectral transmittance curves of the Example 10-2 are illustrated in FIG. 5.

TABLE 16

|  |  | E10-1 | E10-2 | E10-3 | E10-4 | E10-5 | E10-6 | E10-7 |
|---|---|---|---|---|---|---|---|---|
| Ultraviolet absorber U | Kind of dye | U1 | U1 | U1 | — | — | U15 | U16 |
|  | Addition amount* | 5 | 5 | 5 | — | — | 5 | 20 |
| Near-infrared absorber A | Kind of dye | — | A2 | A1 | — | A1 | A1 | A1 |
|  | Addition amount* | — | 3 | 3 | — | 3 | 3 | 3 |
| Transparent resin | Kind of resin | B-OKP2 | B-OKP2 | B-OKP2 | B-OKP2 | B-OKP2 | B-OKP2 | B-OKP2 |
| Optical characteristics | Average transmittance [%] (430-620 nm) | 98.0 | 93.0 | 93.6 | 97.7 | 94.5 | 91.8 | 94.0 |
|  | Average transmittance [%] (430-450 nm) | 97.8 | 89.1 | 83.6 | 97.8 | 84.5 | 74.8 | 84.2 |

TABLE 16-continued

|  | E10-1 | E10-2 | E10-3 | E10-4 | E10-5 | E10-6 | E10-7 |
|---|---|---|---|---|---|---|---|
| Average transmittance [%] (350-395 nm) | 3.0 | 0.6 | 0.6 | 1.3 | 1.5 | 0.9 | 0.6 |
| Average transmittance [%] (735-1110 nm) | 3.4 | 0.3 | 0.4 | 3.1 | 0.4 | 0.3 | 0.4 |
| $\lambda_0$(UV) [nm] | 414 | 414 | 415 | 410 | 412 | 414 | 411 |
| $\lambda_{30}$(UV) [nm] | 414 | 415 | 416 | 399 | 400 | 419 | 400 |
| $|\lambda_0(UV) - \lambda_{30}(UV)|$ [nm] | 0 | 1 | 1 | 11 | 12 | 5 | 11 |
| $\lambda_0$(IR) [nm] | 720 | 645 | 651 | 719 | 651 | 652 | 652 |
| $\lambda_{30}$(IR) [nm] | 694 | 644 | 649 | 694 | 649 | 651 | 650 |
| $|\lambda_0(IR) - \lambda_{30}(IR)|$ [nm] | 26 | 1 | 2 | 25 | 2 | 1 | 2 |

*Parts by mass to 100 parts by mass of transparent resin

As is apparent from Table 16 and the like, in the optical filter of the Example 10-1, the transmittance at the wavelength of 430 to 450 nm is sufficiently high, and further, the value of $|\lambda_0(UV)-\lambda_{30}(UV)|$ is small. In each of the optical filters of the Example 10-2 and the Example 10-3, the transmittance at the wavelength of 430 to 450 nm is sufficiently high, the value of $|\lambda_0(UV)-\lambda_{30}(UV)|$ is small, and further, the value of $|\lambda_0(IR)-\lambda_{30}(IR)|$ is small. Specifically, each of the Examples 10-1 to 10-3 corresponds to the optical filter having high utilization efficiency of light in the visible wavelength range and having low incidence angle dependence in the short-wavelength range of the visible wavelength range. Further, each of the Example 10-2 and the Example 10-3 corresponds to the optical filter whose incidence angle dependence is low also in the long-wavelength range of the visible wavelength range.

On the other hand, the Example 10-4 is not provided with the absorbing layer, and the Example 10-5 is provided with the absorbing layer but does not contain the ultraviolet absorber U, so that in each of the Examples, the value of $|\lambda_0(UV)-\lambda_{30}(UV)|$ is large. Specifically, these correspond to the optical filters each having large incidence angle dependence.

The absorbing layer of the Example 10-6 contains the ultraviolet absorber which does not satisfy the requirement (iv-2). Accordingly, the Example corresponds to the optical filter in which the transmittance at the wavelength of 430 to 450 nm is low, and the utilization efficiency of light in the visible wavelength range is low.

The absorbing layer of the Example 10-7 contains the ultraviolet absorber (U9) which does not satisfy the requirements (iv-1) and (iv-2). Accordingly, the Example corresponds to the optical filter having high incidence angle dependence.

The optical filter of the present invention has a good near-infrared blocking characteristic, and it is also excellent in an ultraviolet blocking characteristic, so that it is very effective for use in an imaging device such as a digital still camera whose performance has been improving in recent years, a display device such as a plasma display, and the like.

What is claimed is:

1. An optical filter, comprising a light absorbing layer and a light reflecting layer, wherein the following requirements (i) and (ii) are satisfied:
   (i) in a spectral transmittance curve at an incident angle of 0°, an average transmittance in the wavelength range of 430 to 620 nm is 80% or more, average transmittance in the wavelength range of 430 to 450 nm is 76% or more, average transmittance in the range of 735 to 1100 nm is 5% or less, and average transmittance in the wavelength range of 350 to 395 nm is 5% or less; and
   (ii) there is a wavelength $\lambda_0$(UV) with transmittance of 50% within the wavelength range of 400 to 425 nm in the spectral transmittance curve at the incident angle of 0°, there is a wavelength $\lambda_{30}$(UV) with transmittance of 50% within the wavelength range of 400 to 425 nm in a spectral transmittance curve at an incident angle of 30°, and an absolute value of a difference between the wavelengths, $|\lambda_0(UV)-\lambda_{30}(UV)|$, is 5 nm or less; and
   wherein the light absorbing layer comprises a transparent and an ultra absorber satisfying the following requirements (iv-1) and (iv-2):
   (iv-1) in a light absorption spectrum of a wavelength range of 350 to 800 nm of the ultraviolet absorber dissolved in dichloromethane, there is at least one absorption peak wavelength in the wavelength range of 415 nm or less, and the longest wavelength $\lambda_{max}$(UV) of the absorption peak wavelength(s) in the wavelength range of 415 am or less is within a wavelength range of 360 to 415 nm; and
   (iv-2) in a spectral transmittance curve of the ultraviolet absorber dissolved in dichloromethane, a difference $\lambda_{L90}-\lambda_{L50}$ is 13 nm or less, in which $\lambda_{L90}$ is a wavelength longer than the $\lambda_{max}$(UV) and has transmittance of 90%, and $\lambda_{L50}$ is a wavelength longer than the $\lambda_{max}$(UV) and has transmittance of 50%, provided that transmittance at the $\lambda_{max}$(UV) is 10%.

2. The optical filter according to claim 1, wherein the following requirement (iii) is further satisfied:
   (iii) in addition to the wavelength $\lambda_0$(UV) there is a wavelength $\lambda_0$(IR) with transmittance of 50% within the wavelength range of 600 to 700 nm in the spectral transmittance curve at the incident angle of 0°, in addition to the wavelength $\lambda_{30}$(UV) there is a wavelength $\lambda_{30}$(IR) with transmittance of 50% within the wavelength range of 600 to 700 inn in the spectral transmittance curve at the incident angle of 30°, and an absolute value of a difference between the wavelengths, $|\lambda_0(IR)-\lambda_{30}(IR)|$, is 5 nm or less.

3. The optical tilter according to claim 1,
   wherein
   the ultraviolet absorber in the transparent resin has at least one absorption peak wavelength in the wavelength range of 415 nm or less in the light absorption spectrum of the wavelength range of 350 to 800 nm, and the longest wavelength $\lambda_{max-P}$(UV) of the absorption peak wavelength(s) in the wavelength range of 415 nm or less is within a range of 360 to 415 nm; and
   when the ultraviolet absorber is contained in an amount which causes transmittance at the $\lambda_{max-P}$(UV) of the ultraviolet absorber to be 10%, a difference $\lambda_{P90}-\lambda_{P50}$ is 14 nm or less, in which $\lambda_{P90}$ is a wavelength longer than the $\lambda_{max \cdot P}(UV)$ and has transmittance of 90%, and $\lambda_{P50}$ is a wavelength longer than the $\lambda_{max \cdot P}(UV)$ and has transmittance of 50%.

4. The optical filter according to claim 1, wherein
the ultraviolet absorber comprises at least one selected from the group consisting of oxazole-based ultraviolet absorbers and merocyanine-based ultraviolet absorbers.

5. The optical filter according to claim 4, wherein the ultraviolet absorber consists of one selected from the group consisting of oxazole-based ultraviolet absorbers and merocyanine-based ultraviolet absorbers.

6. The optical filter according to claim 1, wherein a content of the ultraviolet absorber in the light absorbing layer is from 0.01 to 30 parts by mass relative to 100 parts by mass of the transparent resin.

7. The optical filter according to claim 1, wherein the light absorbing layer further comprises a near-infrared absorber satisfying the requirement (v):
(v) in a light absorption spectrum of a wavelength range of 350 to 800 nm of the near-infrared absorber dissolved in dichloromethane, there is an absorption peak wavelength $\lambda_{max}(IR)$ being the longest wavelength within a wavelength range of 650 to 800 nm.

8. The optical filter according to claim 7, wherein the near-infrared absorber is at least one selected from the group consisting of squarylium-based near-infrared absorbers, cyanine-based near-infrared absorbers, phthalocyanine-based near-infrared absorbers, naphthalocyanine-based near-infrared absorbers, dithiol metal complex-based near-infrared absorbers, azo-based near-infrared absorbers, polymethine-based near-infrared absorbers, phthalide-based near-infrared absorbers, naphthoquinone-based near-infrared absorbers, anthraquinone-based near-infrared absorbers, indophenol-based near-infrared absorbers, pyrylium-based near-infrared absorbers, thiopyrylium-based near-infrared absorbers, squarylium-based near-infrared absorbers, croconium-based near-infrared absorbers, tetradehydrocholine-based near-infrared absorbers, triphenylmethane-based near-infrared absorbers, aminium-based near-infrared absorbers, and diimonium-based near-infrared absorbers.

9. The optical filter according to claim 7, wherein a content of the near-infrared absorber in the light absorbing layer is from 0.1 to 30 parts by mass relative to 100 parts by mass of the transparent resin.

10. The optical filter according to claim 1, wherein a refractive index of the transparent resin is 1.45 or more.

11. The optical filter according to claim 10, wherein the transparent resin is at least one selected from the group consisting of a polyester resin, a polyether resin, an acrylic resin, a polyolefin resin, a polycycloolefin resin, a polycarbonate resin, an ene-thiol resin, an epoxy resin, a polyamide resin, a polyimide resin, a polyurethane resin, and a polystyrene resin.

12. The optical filter according to claim 1, further comprising a transparent substrate, wherein the light absorbing layer and the light reflecting layer are stacked on the transparent substrate.

13. The optical e according to claim 1, wherein the light reflecting layer satisfies the folk g requirement:

in a spectral transmittance curve at an incident angle of 0°, a transmittance in the wavelength range of 420 to 695 nm is 85% or more, a transmittance in the wavelength range of 350 to 400 nm is 5% or less, and a transmittance in the wavelength of 735 to 1100 nm is 55% or less.

14. The optical filter according to claim 1, wherein the ultraviolet absorber excludes 2,5-Bis(5'-tert-butylbezoxazolyl)thiophene.

15. The optical filter according to claim 1, wherein the ultraviolet absorber in the transparent resin has at least one absorption peak wavelength in the wavelength range of 415 nm or less in the light absorption spectrum of the wavelength range of 350 to 800 nm, the longest wavelength $\lambda_{max \cdot P}(UV)$ of the absorption peak wavelength(s) in the wavelength range of 415 nm or less is within a range of 360 to 415 nm.

16. The optical filter according to claim 1, wherein the ultraviolet absorber comprises a merocyanine-based dye of formula (M),

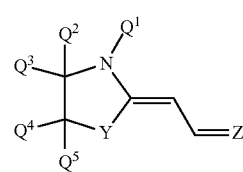

(M)

wherein Y represents a methylene group substituted by $Q^6$ and $Q^7$ or an oxygen atom;

$Q^1$ represents an optionally substituted monovalent hydrocarbon group with a carbon number of 1 to 12;

each of $Q^2$ to $Q^7$ independently represents a hydrogen atom, a halogen atom, or an alkyl group or an alkoxy group with a carbon number of 1 to 10; and Z represents any one of bivalent groups represented by the formulas (Z1) to (Z5)

wherein each of $Q^8$ and $Q^9$ independently represents an optionally substituted monovalent hydrocarbon group with a carbon number of 1 to 12, and each of $Q^{10}$ to $Q^{19}$ independently represents a hydrogen atom, or an optionally substituted monovalent hydrocarbon group with a carbon number of 1 to 12

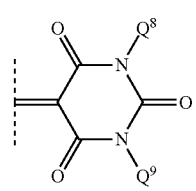

(Z1)

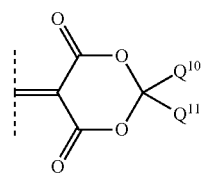

(Z2)

-continued

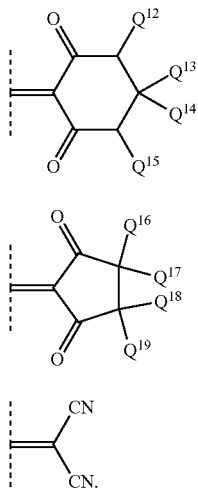

(Z3)

(Z4)

(Z5)

17. The optical filter according to claim 16,
wherein, each of $Q^1$, $Q^8$, and $Q^9$ is independently an alkyl group with a carbon number of 1 to 6 substituted by a cycloalkyl group or a phenyl group, and each of $Q^2$ to $Q^7$, and $Q^{10}$ to $Q^{19}$ is independently a hydrogen atom, or an alkyl group with a carbon number of 1 to 6.

18. The optical filter according to claim 16,
wherein, each of $Q^1$, $Q^8$, and $Q^9$ is independently an alkyl group with a carbon number of 1 to 6, and each of $Q^2$ to $Q^7$, and $Q^{10}$ to $Q^{19}$ is independently a hydrogen atom, or an alkyl group with a carbon number of 1 to 6.

19. The optical filter according to claim 16,
wherein, each of $Q^2$ and $Q^3$ is independently an alkyl group with a carbon number of 1 to 6.

20. The optical filter according to claim 16,
wherein, Y is an oxygen atom, and Z is a group represented by the for formula (Z1) or the formula (Z2).

21. The optical filter according to claim
wherein the ultraviolet absorber comprises a dye of formula (N),

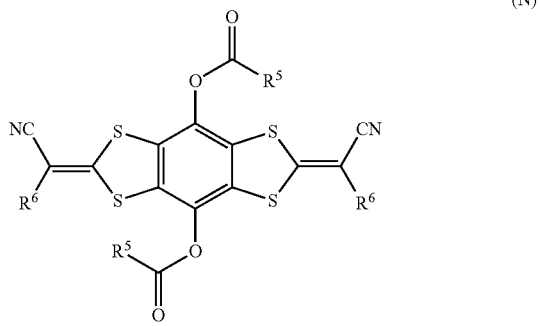

(N)

wherein:
each of $R^5$ independently represents a hydrocarbon group with a carbon number of 1 to 20 optionally substituted with a saturated or unsaturated ring structure or a branch; and
each of $R^6$ independently represents a cyano group or —COOR$^7$;
wherein $R^7$ is a hydrocarbon group with a carbon number of 1 to 20 optionally substituted with a saturated or unsaturated ring structure, or a branch.

\* \* \* \* \*